(12) United States Patent
Koarai

(10) Patent No.: US 7,978,359 B2
(45) Date of Patent: Jul. 12, 2011

(54) CONTROL DEVICE, IMAGE PROCESSING DEVICE CONTROL SYSTEM, METHOD OF CONTROLLING CONTROL DEVICE, PROGRAM, AND COMPUTER-READABLE RECORDING MEDIUM

(75) Inventor: Shoji Koarai, Kitakatsuragi-Gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 1139 days.

(21) Appl. No.: 11/731,884

(22) Filed: Mar. 29, 2007

(65) Prior Publication Data

US 2007/0268517 A1    Nov. 22, 2007

(30) Foreign Application Priority Data

Apr. 11, 2006   (JP) .................................. 2006-109146

(51) Int. Cl.
*G06F 3/12* (2006.01)
*G06K 15/00* (2006.01)

(52) U.S. Cl. ....................... 358/1.15; 358/1.13; 358/1.14

(58) Field of Classification Search .................... 358/1.1, 358/1.13, 1.14, 1.15, 1.16, 1.18, 448, 468, 358/407, 1.17, 1.2, 1.9, 1.11, 400, 401, 404, 358/500, 501; 399/1, 8, 9, 10, 11; 347/1, 347/2, 3, 5, 14, 23; 710/8, 15, 17, 18, 19, 710/62, 64, 72; 382/162, 167, 303, 304

See application file for complete search history.

(56) References Cited

U.S. PATENT DOCUMENTS

| 2003/0231328 A1* | 12/2003 | Chapin et al. ................. 358/1.13 |
| 2005/0128503 A1* | 6/2005 | Matsushita ................... 358/1.13 |
| 2009/0323106 A1* | 12/2009 | Suga ............................ 358/1.15 |

FOREIGN PATENT DOCUMENTS

| JP | 2001-056756 | 2/2001 |
| JP | 2001-350681 | 12/2001 |
| JP | 2003-330665 | 11/2003 |
| JP | 2004-206585 A | 7/2004 |
| JP | 2005-064657 | 3/2005 |

* cited by examiner

*Primary Examiner* — Dov Popovici

(74) *Attorney, Agent, or Firm* — Edwards Angell Palmer & Dodge LLP; David G. Conlin; David A. Tucker

(57) ABSTRACT

In an image processing device control system, a function that a predetermined image processing device operated by the user cannot execute is executable by a substitute device, the user can input to the predetermined image processing device setting information regarding the function; and a control device includes: a multifunction device specifying section specifying a multifunction device having the function to the user-operated multifunction device; a UI control section sending to the user-operated multifunction device, data of the setting screen of the function; and a device control section which receives from the user-operated multifunction device the setting information of the function, and sends, to the multifunction device specified by the multifunction device specifying section, the setting information and a control instruction which instructs the execution of the function.

19 Claims, 26 Drawing Sheets

FIG. 4

| OPERATION SCREEN | PUSH BUTTON INFORMATION | PROCESSING CONTENT INFORMATION | | |
|---|---|---|---|---|
| | PUSH BUTTON | UI CONTROL SECTION | APPLICATION INSTRUCTION SECTION | MULTIFUNCTION DEVICE SPECIFYING SECTION |
| ... | ... | ... | ... | ... |
| EXECUTING FUNCTION SELECTION SCREEN | SCANNING | SCANNING SETTING SCREEN | — | — |
| EXECUTING FUNCTION SELECTION SCREEN | COPYING | COPYING SETTING SCREEN | — | — |
| EXECUTING FUNCTION SELECTION SCREEN | OCR/ TRANSLATION | OCR/TRANSLATION SETTING SCREEN | — | — |
| ... | ... | ... | ... | ... |
| SCANNING SETTING SCREEN | SELECT RESOLUTION | RESOLUTION SELECTION SCREEN | — | — |
| SCANNING SETTING SCREEN | EXECUTE SCANNING | SCANNING EXECUTION SCREEN ("NOW SCANNING") | — | SPECIFY MULTIFUNCTION DEVICE WHICH IS CAPABLE OF SCANNING |
| ... | ... | ... | ... | ... |
| LOGIN SCREEN | OK | LOGGING-IN SCREEN ("LOGGING IN...") | AUTHENTICATION APPLICATION | — |
| ... | ... | ... | ... | ... |

FIG. 5

| No. | INFORMATION | VALUE | VALUE |
|---|---|---|---|
| 1 | NAME OF MULTIFUNCTION DEVICE | MULTIFUNCTION DEVICE X | MULTIFUNCTION DEVICE Y |
| 2 | IP ADDRESS | XX.XX.XX.XX | YY.YY.YY.YY |
| 3 | COLOR/MONOCHROME | COLOR | MONOCHROME |
| 4 | FUNCTION 1 | PRINTING FUNCTION | PRINTING FUNCTION |
| 5 | FUNCTION 2 | COPYING FUNCTION | COPYING FUNCTION |
| 6 | FUNCTION 3 | FACSIMILE TRANSMISSION FUNCTION | FACSIMILE TRANSMISSION FUNCTION |
| 7 | FUNCTION 4 | — | OCR/TRANSLATION FUNCTION |
| 8 | FUNCTION 5 | — | — |
| 9 | FUNCTION 6 | — | — |
| 10 | PRINTING SPEED | COLOR: 30 SHEETS PER MINUTE MONOCHROME: 50 SHEETS PER MINUTE | MONOCHROME: 50 SHEETS PER MINUTE |
| 11 | STATE | NORMAL | NORMAL |
| ... | ... | ... | ... |

FIG. 6

| CONTROL CONTENTS | CONTROL INSTRUCTIONS (IN THE ORDER OF BEING CALLED) | | | | |
|---|---|---|---|---|---|
| | FIRST | SECOND | THIRD | FOURTH | |
| SCANNING | JobCreate | ExecuteScan | JobClose | | ... |
| ... | ... | ... | ... | | |

FIG. 8

| FIRST APIs FROM OSA APPLICATION LAYER | SECOND APIs (IN THE ORDER OF BEING CALLED) DISCLOSED BY SERVICE LAYER | | | |
|---|---|---|---|---|
| | FIRST | SECOND | THIRD | FOURTH |
| ExecuteCopy | Do Scan | Do Print | | |
| ExecuteScan | Do Scan | SaveFile | SendByFTP | |
| ExecuteFAX | Do Scan | SaveFile | SendByLine | |
| ExecutePrint | SaveFile | DoPrint | | |
| ... | ... | ... | ... | ... |

FIG. 25

```
<html>
<body>
<form class="osa_menu" title="THIS IS TITLE" action="next_page.aspx ">    ...SECTION (A)
<input id="id_ok"/>
<input id="id_cancel"/>                                                   ...SECTION (B)
<input id="id_prev"/>
<input id="id_exit"/>
<fieldset title="THIS IS PROMPT TEXT">                                    ...SECTION (C)
<input id="btn1" type="submit" title="BUTTON1" />
<input id="btn2" type="submit" title="BUTTON2" />
<input id="btn3" type="submit" title="BUTTON3" />
<input id="btn4" type="submit" title="BUTTON4" />                         ...SECTION (D)
<input id="btn5" type="submit" title="BUTTON5" />
<input id="btn6" type="submit" title="BUTTON6" />
<input id="btn7" type="checkbox" title="BUTTON7" selected='true'/>
<input id="btn8" type="checkbox""submit" title="BUTTON8" />
</fieldset>
</form>
</body>
</html>
```

FIG. 26

MENU FORM (SPECIFIED BY class="osa_menu")

| COMPONENT INFORMATION | TYPE OF IMAGE DISPLAY ON OPERATION SCREEN |
|---|---|
| Title | <text x="5" y="2" x2="50" y2="8" >THIS IS TITLE<text> |
| <input id="id_ok"/> | <button x="130" y="2" x2="145" y2="8" >OK<text> |
| <input id="id_cancel"/> | <button x="110" y="2" x2="135" y2="8" >CANCEL<text> |
| <input id="id_prev"/> | <button x="90" y="2" x2="105" y2="8" >BACK <text> |
| <input id="id_exit"/> | <button x="70" y="2" x2="85" y2="8" >EXIT<text> |
|  | <line x="10" y="15" x2="140" y2="10" > |
| title="THIS IS PROMPT TEXT" | <text x="5" y="12" x2="20" y2="18">THIS IS TITLE<text> |
| < input id="btn1"  BUTTON1 type="submit" | <text x="20" y="22" x2="65" y2="26">BUTTON1<text> |
| ... | ... |

CONTROL DEVICE, IMAGE PROCESSING DEVICE CONTROL SYSTEM, METHOD OF CONTROLLING CONTROL DEVICE, PROGRAM, AND COMPUTER-READABLE RECORDING MEDIUM

This Nonprovisional application claims priority under 35 U.S.C. §119(a) on Patent Application No. 109146/2006 filed in Japan on Apr. 11, 2006, the entire contents of which are hereby incorporated by reference.

FIELD OF THE INVENTION

The present invention relates to a control device which is connected to and communicable with plural image processing devices, and controls each of these image processing devices.

BACKGROUND OF THE INVENTION

There have conventionally been multifunction devices which can perform plural image processing functions such as copying, scanning, printing, and facsimile transmission. In recent years, a plurality of such multifunction devices are connected to a PC (Personal Computer) or the like via a communications network, in order to perform a variety of processes.

Patent Document 1 proposes a network printing system. In this system, if a supplied print job cannot be sent to a printer which is designated as a target by a client, a substitute printer is automatically found out and the print job is sent thereto.

Patent Document 2 proposes an image formation system including a plurality of printers. According to this system, if one printer cannot perform printing, the system searches a registered list of printers for another printer having functions equivalent to or higher than the functions of that printer have already been registered, and notifies the user of the discovered printer or causes the discovered printer to automatically perform printing as substitute for the dysfunctional printer.

Patent Document 3 proposes a multifunction device which is arranged such that substitute printer information is registered in advance and print data is supplied to a substitute printer if the printer of the multifunction device cannot perform printing.

Patent Document 1: Japanese Laid-Open Patent Application No. 2001-56756; published on Feb. 27, 2001
Patent Document 2: Japanese Laid-Open Patent Application No. 2003-330665; published on Nov. 21, 2003
Patent Document 3: Japanese Laid-Open Patent Application No. 2005-64657; published on Mar. 10, 2005

SUMMARY OF THE INVENTION

The conventional art, however, is disadvantageous in that, when a function that the user instructed to a predetermined device to execute is executed by an alternative device, the user cannot input, to the predetermined device, setting information in regard of the function.

For example, assume that a document is scanned by a multifunction device. Regarding the scanning function, it is possible to set double-sided/single-sided scanning, scanning density, scanning ratio, or the like. According to the conventional art, the user is required to move to the substitute device and input the setting information by using the operation panel of the substitute device.

The present invention was done to solve the problem above, and the objective of the present invention is to provide an image processing device control system in which a function that a predetermined image processing device operated by the user cannot execute is executable by a substitute device and the user can input to the predetermined image processing device the setting information in regard of the function, and particularly to provide a control device for the system.

To achieve the objective above, a control device of the present invention is connected to and able to communicate with plural image processing devices executing functions regarding image processing, and characterized by including: information receiving means for receiving, from a first image processing device among said plural image processing devices, selected function information including information which indicates that the first image processing device has been instructed to execute a function that the first image processing device is unable to execute and which also indicates a type of the function to be executed; processing device specifying means for specifying, among said plural image processing devices, an image processing device which is able to execute the function that the first image processing device is unable to execute; UI control means for sending, to the first image processing device, data of a setting screen which prompts a user to input setting information for executing the function that the first image processing device is unable to execute; and device control means for receiving the setting information from the first image processing device, and sending, to the image processing device specified by the processing device specifying means, the setting information and a control instruction which instructs to execute the function indicated by the selected function information.

According to this arrangement, the multifunction device specifying means specifies, among plural image processing devices on the network, an image processing device that can execute the function that the first image processing device cannot execute. Also, in the first image processing device operated by the user, the information receiving means receives the selected function information which is transmitted when the execution of the function that the image processing device cannot execute is instructed by the user. Then the device control means sends, to the image processing device specified by the processing device specifying means, a control instruction which instructs to execute the function indicated by the selected function information. On this account, even if the first image processing device operated by the user is instructed to execute a function that the first image processing device cannot execute, the function can be executed by a substitute image processing device.

Moreover, according to the arrangement above, data of a setting screen which prompts the user to input setting information in regard of the function that the user-operated first image processing device does not have is supplied to the first image processing device by the UI control means. On this account, the first image processing device can display the setting screen of the function that the device cannot execute. The setting information that the user has input is then supplied from the user-operated image processing device to the control device. This setting information is received by the device control means, and supplied to the image processing device specified by the multifunction device specifying means, i.e. to the image processing device that actually executes the function. The user can therefore input, to the first image processing device to which the user has instructed to execute the function, the setting information in regard of the function that the first image processing device cannot execute.

To achieve the objective above, an image processing device control system of the present invention is characterized by including the aforesaid control device and the aforesaid plural image processing devices.

According to this arrangement, a substitute device can execute a function that a predetermined image processing device cannot execute, and the user can input setting information in regard of the function, to the image processing device to which the user instructed to execute the function.

To achieve the objective above, another image processing device control system of the present invention is characterized by including: plural image processing devices executing functions regarding image processing; and a control device which is connected to and able to communicate with said plural image processing devices, the control device including: information receiving means for receiving selected function information including information which indicates that the first image processing device has been instructed to execute a function that the first image processing device is unable to execute and which also indicates a type of the function to be executed; processing device specifying means for specifying, among said plural image processing devices, an image processing device which is able to execute the function that the first image processing device is unable to execute; UI control means for sending, to the first image processing device, data of a setting screen which prompts a user to input setting information for executing the function that the first image processing device is unable to execute; and device control means for receiving the setting information from the first image processing device, and sending, to the image processing device specified by the processing device specifying means, the setting information and a control instruction which instructs to execute the function indicated by the selected function information, each of said plural image processing device including: a display section; information notification means for sending, when that information processing device is instructed to execute a function which is unable to be executed by that information processing device, the selected function information including information indicating a type of the function to be executed, to the control device; UI processing means for (i) receiving, from the control device, data of a setting screen which prompts the user to input setting information in regard of the function that that information processing device is unable to execute, (ii) displaying the setting screen on the display section so as to obtain the setting information from the user, and (iii) sending the obtained setting information to the control device; control instruction receiving means for receiving, from the control device, the setting information and the control instruction; and function executing means for executing, when the control instruction receiving means receives the setting information and the control instruction, the function indicated by the received control instruction, based on the received setting information.

According to this arrangement, the multifunction device specifying means of the control device specifies, among plural image processing devices on the network, an image processing device that can execute the function that the user-operated first image processing device cannot execute. Also, in the first image processing device operated by the user, the information receiving means receives the selected function information which is transmitted from the first image processing device to the control device, when the execution of the function that the image processing device cannot execute is instructed by the user. Then the device control means of the control device sends, to the image processing device specified by the processing device specifying means, a control instruction which instructs to execute the function indicated by the selected function information. On this account, even if the first image processing device operated by the user is instructed to execute a function that the first image processing device cannot execute, the function can be executed by a substitute image processing device.

Moreover, according to the arrangement above, data of a setting screen which prompts the user to input setting information in regard of the function that the user-operated first image processing device does not have is supplied to the first image processing device by the UI control means. On this account, in the first image processing device that the user operates, the UI processing means displays, on the display section, the setting screen corresponding to the supplied data of the setting screen. In this manner, the first image processing device can display a setting screen of a function that the first image processing device cannot execute. The setting information that the user has input is then supplied from the user-operated image processing device to the control device. This setting information is received by the device control means, and supplied to the image processing device specified by the multifunction device specifying means, i.e. to the image processing device that actually executes the function. The user can therefore input, to the first image processing device to which the user has instructed to execute the function, the setting information in regard of the function that the first image processing device cannot execute.

The control device may be realized by hardware or realized by causing a computer to execute a program. More specifically, a program of the present invention causes a computer to operate as the aforesaid means of the control device, and a storage medium of the present invention stores the program.

When such a program is executed by a computer, the computer operates as the aforesaid control device. It is therefore possible to obtains effects similar to those of the aforesaid control device.

To achieve the objective above, a method of the present invention for controlling a control device, which is connected to and able to communicate with plural image processing devices executing functions regarding image processing, is characterized by including the steps of: receiving, from a first image processing device among said plural image processing devices, selected function information including information which indicates that execution of a function that the first image processing device is unable to execute has been instructed to the first image processing device and which also indicates a type of the function to be executed; specifying, by processing device specifying means, which image processing device among said plural image processing devices is able to execute the function that the first image processing device is unable to execute; sending, to the first image processing device, data of a setting screen which prompts a user to input setting information for executing the function that the first image processing device is unable to execute; and receiving the setting information from the first image processing device, and sending, by the device control means, the setting information and a control instruction which instructs to execute the function indicated by the selected function information, to the image processing device specified by the processing device specifying means.

According to the arrangement above, since the aforesaid control device is realized, a substitute image processing device can execute a function that a first image processing device operated by the user cannot execute, and the user can input, to the first image processing device to which the user has instructed to execute the function, setting information regarding the function that the first image processing device cannot execute.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 4 relates to an embodiment of the present invention and shows an example of push button-process content table.

FIG. 5 relates to an embodiment of the present invention and shows an example of a multifunction device function list table.

FIG. 6 relates to an embodiment of the present invention and shows an example of a control instruction table.

FIG. 8 relates to an embodiment of the present invention and shows an example of a command conversion table.

FIG. 25 relates to an embodiment of the present invention and shows an example of the operation screen data supplied from the control device.

FIG. 26 relates to an embodiment of the present invention and shows an example of UI data.

DESCRIPTION OF THE EMBODIMENTS

Embodiment 1

The following will describe an embodiment of the present invention with reference to FIGS. 1-27. As an example of an image processing device control system of the present invention, the present embodiment deals with a multifunction device control system in which a multifunction device is used as an image processing device. The multifunction device control system of the present embodiment is arranged such that, when a function which cannot be executed by one multifunction device is automatically executed by a substitute multifunction device, the user can input setting information regarding the function to the multifunction device which has originally been instructed to execute the function. FIG. 2 outlines the multifunction device control system of the present embodiment. As shown in the figure, the multifunction device control system includes plural multifunction devices 1 and a control device 2 which are connected to one another over a communications network.

The multifunction device 1 has various image processing functions such as copying, scanning, printing, image data transmission, image conversion, and OCR/translation of scanned images. The multifunction device 1 is, for example, an MFP (Multi Function Printer) in which a printer, a photocopier, a facsimile machine, a scanner, and a processing unit performing arithmetic processing are combined into a single device. The multifunction devices 1 have different types and numbers of functions. In the present invention, a scanner which only has a scanning function, a printer which only has a printing function, or the like may be provided instead of the multifunction device 1.

Figure 3:
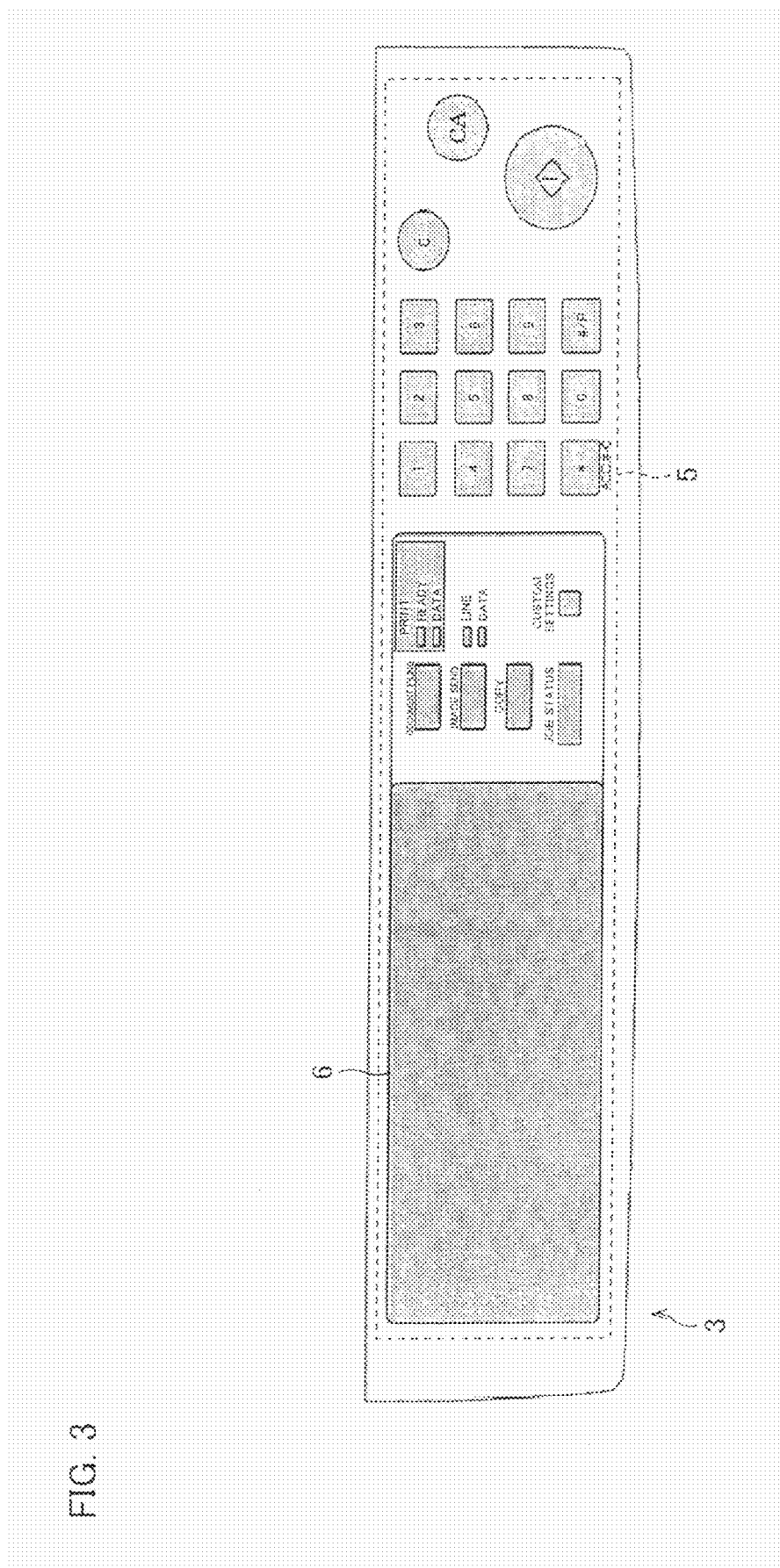
FIG. 3 relates to an embodiment of the present invention and shows the exterior appearance of an operation section of a multifunction device.

FIG. 3 is an enlarged view of an operation section of the multifunction device 1. As shown in this figure, the multifunction device 1 has an operation section 3 as a user interface. This operation section 3 is provided with an operation panel (display section) 6 which displays an operation screen for the user and an input section 5 which receives user input. It is noted that the operation panel 6 adopts a touch panel system and hence the operation panel 6 also functions as the input section 5.

The multifunction device 1 may be connectable with a UI device in place of or in addition to the operation section 3. In such a case, the UI device connected to the multifunction device 1 displays an operation screen.

The control device 2 is, for example, a personal computer. Various applications are installed in the control device 2, and the control device 2 performs processes in accordance with the applications and can communicate with the multifunction device 1 over the communications network. Examples of the communications network include the Internet, telephone lines, serial cables, and other wired and wireless lines.

The control device 2 controls the functions of the multifunction devices 1 over the communications network. In regard of the control of the multifunction devices 1, the control device 2 causes a function of one multifunction device 1 to cooperate with a function of another multifunction device 1. As a result of this, the multifunction devices 1 of the multifunction device control system can perform combined functions which cannot be performed by a single device.

To control various functions of the multifunction devices 1, the control device 2 may use one or more Web services provided by the multifunction devices 1. An web service is a program process which allows a device to use functions of another device over a network, and is typically based on SOAP.

To cooperate with a function of another multifunction device 1, a multifunction device 1 accesses the control device 2 which is an Web server so as to obtain operation screen data therefrom, and displays the operation screen on the operation panel 6. In short, the multifunction device 1 can interact with the user. The multifunction device 1 can therefore display an operation screen only by requesting the control device 2 to supply the operation screen data, and hence the multifunction device 1 is not required to manage operation screens and data thereof.

Examples of the operation screens include (i) an executing function selection screen on which selection items for selecting a function to be executed are displayed in order to prompt the user to select one of the functions and (ii) a setting screen which prompts the user to input setting information regarding a function to be executed.

It is notable that the operation panel 6 of the multifunction device 1 displays an executing function selection screen which even shows those selection items corresponding to functions not executable by that device, and if the user instructs to execute one of those non-executable functions, the operation panel 6 displays the setting screen for that function (non-executable function).

The multifunction devices 1 share APIs (Application Program Interfaces; control instructions) which are open to the outside, regardless of the types of the devices. The control device 2 can therefore output same control instructions to all multifunction devices 1 regardless of the types thereof, and this makes it easy to develop programs embedded in the control device 2. The API is a group of rules (functions) stipulating relations between instructions which can be used for software development and procedures executed by the respective instructions.

The multifunction devices 1 and the control device 2 use HTTP or HTTPS supporting SSL (Secure Socket Layer), for communications regarding requests/responses of operation screen data. HTTPS is suitable for improving security as compared to HTTP. Examples of markup languages used for such communications are HTML (Hypertext Markup Language), XML (eXtensible Markup Language), WML (Wireless Markup Language), and XHTML (eXtensible HyperText Markup Language) and/or other languages.

XML is a descriptive language with document structure, which allows data transmissions as easy as HTML. XML is advantageous in (1) that the user can define the meaning of a character string in a document, (2) not being dependent on any particular software, and (3) being easily programmable, and the like.

In the meanwhile, control instructions by which the control device 2 controls the multifunction devices 1 are transmitted by means of a protocol for communications between objects. An examples of such a protocol is SOAP (Simple Object Access Protocol) using a markup language such as XML. SOAP is an XML-based or HTTP-based protocol for calling data and services, and enables plural systems to collaborate with one another.

The following will discuss how the control device 2 and the multifunction devices 1 are arranged.

(Control Device)

Figure 1:
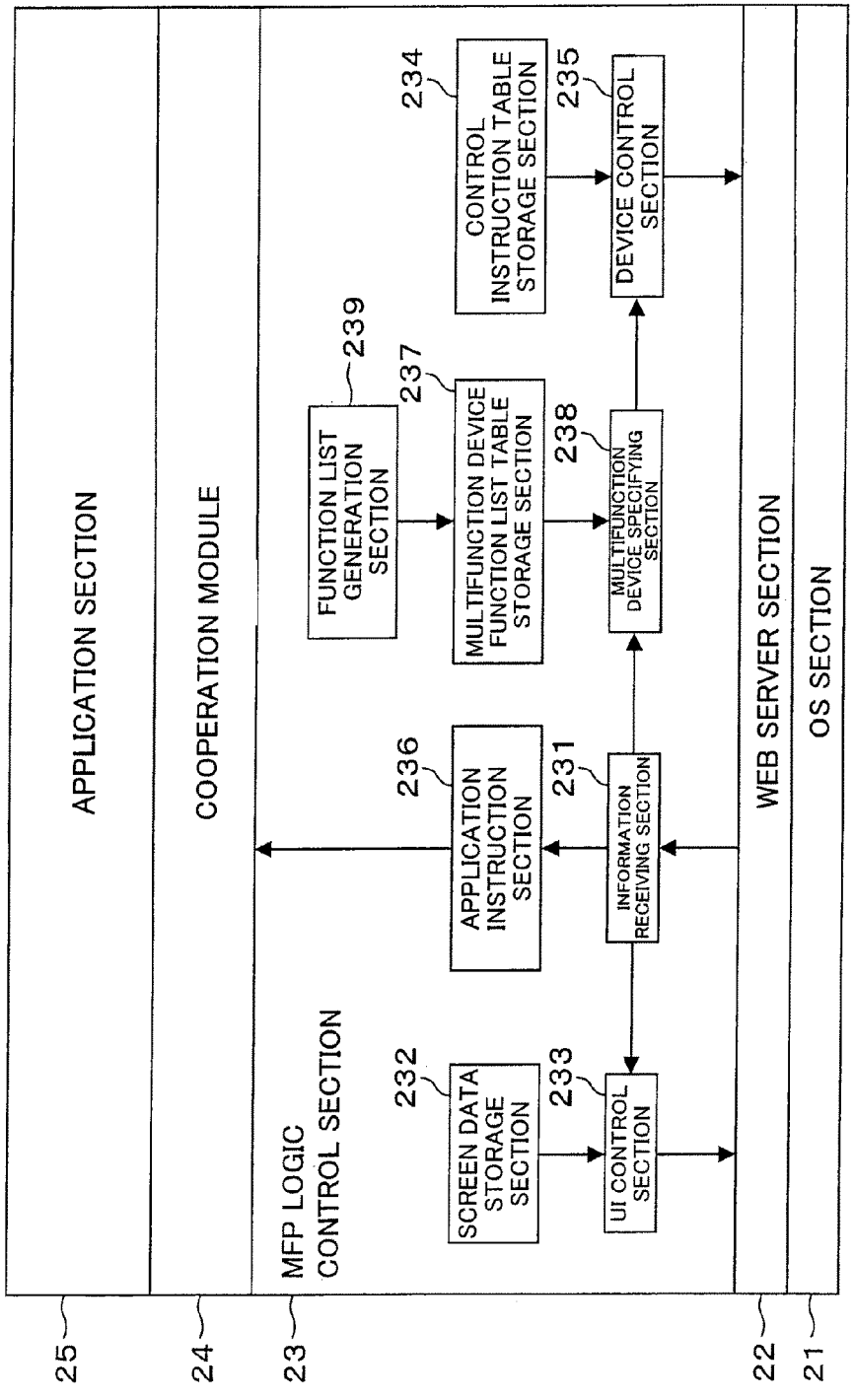
FIG. 1 relates to an embodiment of the present invention and is a block diagram showing a functional arrangement of a control device.
Figure 2:
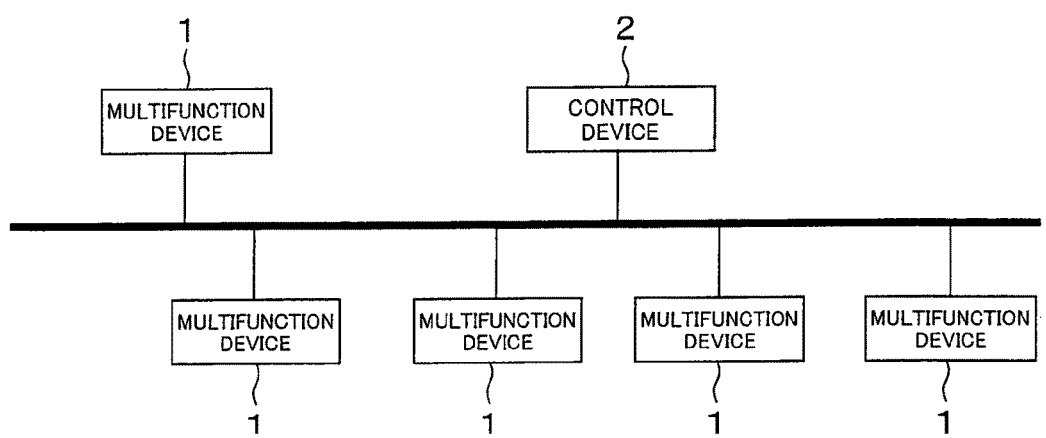
FIG. 2 relates to an embodiment of the present invention and is a block diagram which outlines a multifunction device control system.

FIG. 1 is a block diagram showing the inside of the control device 2 of the present embodiment. As shown in the figure, the control device 2 includes an OS section 21, a Web server section 22, a MFP control logic section 23, a cooperation module 24, and an application section 25.

The OS section 21 is a block which controls a computer system and performs processes in accordance with an operation system (OS) that provides a basic user operation environment. Examples of the OS include Windows® and Linux®.

The Web server 22 performs communications based on a protocol such as HTTP (or HTTPS) and SOAP. The Web server section 22 receives an HTTP request from the multifunction device 1, and returns an HTTP response corresponding to the supplied HTTP request. The Web server section 22 is a block which operates in accordance with software such as Apache.

The MFP control logic section 23 controls the operation screen (UI) of the multifunction device 1 and various functions of the multifunction device 1. The MFP control logic section 23 includes an information receiving section (information receiving means) 231, a screen data storage section 232, a UI control section (UI control means) 233, a control instruction table storage section 234, a device control section (device control means) 235, an application instruction section 236, a multifunction device function list table storage section (storage means) 237, a multifunction device specifying section (processing device specifying means) 238, and a function list generation section (function list generation means) 239.

The information receiving section 231 receives information from the multifunction device 1 via the Web server section 22, and instructs the UI control section 233, the application instruction section 236, and the multifunction device specifying section 238 to carry out processes corresponding to the supplied information. Examples of the information that the information receiving section 231 receives from the multifunction device 1 include: transmission request information (request information) which requests data specified by a URL (Uniform Resource Locator) to transmit; push button information indicating which button has been pushed on an operation screen generated based on operation screen data supplied from the UI control section 233; and processing request information which requests the application section 25 to perform a process.

The information receiving section 231 obtains the transmission request information and the push button information from the Web server section 22, by means of HTTP (or HTTPS). Also the information receiving section 231 obtains the processing request information from the Web server section 22, by means of SOAP.

Push button information, which indicates a button which has been pushed on an executing function selection screen in the operation screen, corresponds to selected function information indicating the type of the function, of the multifunction device 1, that the user has instructed to execute. In the meanwhile, Push button information, which indicates a push button which has been pushed on a setting screen in the operation screen, corresponds to setting information in regard of the function, of the multifunction device 1, that the user has instructed to execute.

Examples of the processing request information supplied to the application section 25 include information which requests an authentication application to perform user authentication and information which requests an event tabulation application to perform tabulation. The processing request information is, however, not limited to the above. Any type of information may be used as the processing request information, on condition that the information is arbitrarily (or regularly) supplied from the multifunction device 1 and the application section 25 performs a process in response to the information.

Receiving the transmission request information, the information receiving section 231 outputs the supplied transmission request information to the UI control section 233. Also, the information receiving section 231 manages push button processing table in which (i) push button information which indicates which button has been pushed on the operation screen is associated with (ii) processing information which indicates the content of a process carried out by the UI control section 233, the application instruction section 236, or the multifunction device specifying section 238, in response to the push of the button.

FIG. 4 shows an example of a push button-process content table. In this table, (i) push button information indicating that a "Copy" button in an executing function selection screen of the operation screen has been pushed is associated with (ii) a process to display "copy setting screen", which process is carried out by the UI control section 233. Also in the table, (i) push button information indicating that an "OK" button in a scanning setting screen of the operation screen has been pushed is associated with (ii) a process to specify which multifunction device can execute "scanning", which process is performed by the multifunction device specifying section 238. In addition to the above, (i) the push button information indicating that an "OK" button in a login screen of the operation screen has been pushed is associated with (ii) a process that the UI control section 233 supplies, to the multifunction device 1, the data of a logging-in screen (screen displaying the notice "logging in . . . ") as the next screen, and instructs the application instruction section 236 to activate the authentication application.

Receiving the push button information, the information receiving section 231 specifies the processing content information corresponding to the supplied push button information in the push button processing table, and instructs the UI control section 233, the application instruction section 236, and the multifunction device specifying section 238 to execute the processes indicated by the specified processing information. In other words, in case where the processing content information relates to UI control, the information receiving section 231 notifies the UI control section 233 of what is indicated by the information. In case where the processing content information relates to an application, the information receiving section 231 notifies the application instruction section 236 of what is indicated by the information. In case where the processing content information relates to an instruction to execute a function, the information receiving section 231 notifies the multifunction device specifying section 238 of what is indicated by the information.

The screen data storage section 232 stores operation screen data that indicates each operation screen displayed on the operation panel 6 of the multifunction device.

The UI control section 233 reads out, from the screen data storage section 232, operation screen data corresponding to the instruction from the information receiving section 231, and outputs the operation screen data to the multifunction device 1 via the Web server section 22. The UI control section 233 uses HTTP (or HTTPS) to transmit the operation screen data.

The application instruction section 236 instructs the application section 25 to start a process in accordance with the instruction from the information receiving section 231.

The multifunction device function list table storage section 237 stores a multifunction device function list table (each device function list information) which indicates the list of functions of each multifunction device 1. In this multifunction device function list table, identification information (e.g. name and IP address of the device) of the multifunction device 1 is associated with the functions of that multifunction device 1. It is therefore possible to find which multifunction device has a desired function. The multifunction device function list table includes status information which indicates whether or not each multifunction device operates in order.

FIG. 5 shows an example of the multifunction device function list table. As shown in the figure, the multifunction device function list table indicates that a multifunction device X is color compatible, has a printing function, a copying function, and a facsimile transmission function, and is operating in order, whereas a multifunction device Y is a monochrome type, has an OCR/translation function in addition to a printing function, a copying function, and a facsimile transmission function, and is operating in order.

The function list generation section 239 generates the foregoing multifunction device function list table, and stores the generated table in the multifunction device function list table storage section 237. More specifically, the function list generation section 239 obtains information of the list of executable functions from each multifunction device 1, and generates the multifunction device function list table based on the obtained information of the lists.

Receiving from the information receiving section 231 the processing content information regarding an instruction to execute a function, the multifunction device specifying section 238 searches for a multifunction device 1 which can execute the function thus instructed, among all of the multifunction devices 1 on the network. In doing so, the multifunction device specifying section 238 refers to the multi device function list table stored in the multifunction device function list table storage section 237. The multifunction device specifying section 238 notifies the device control section 235 of the identification information of the specified multifunction device, along with the processing content information.

The control instruction table storage section 234 stores a control instruction table in which (i) the control content for control over the multifunction device 1 is associated with (ii) a control instruction used for carrying out the control in accordance with the content of control is carried out. FIG. 6 shows an example of the control instruction table. As shown in the figure, the control instruction table storage section 234 stores a control content "Scanning" in association with control instructions "JobCreate", "ExecuteScan", and "JobClose". The control instruction table storage section 234 also stores the order of output of control instructions (order of control), in case where plural control instructions are stored in association with one control content.

As described below, a control instruction stored in the control instruction table storage section 234 is a group of commands for calling APIs that the Open I/F layer 19 of the multifunction device 1 discloses to the outside. Such commands are shared among all types of the multifunction devices 1, and hereinafter referred to as first APIs (first control commands).

The device control section 235 reads out, from the control instruction table storage section 234, a control instruction corresponding to the control content included in the processing content information supplied from the multifunction device specifying section 238, and sends the control instruction to the multifunction device 1 via the Web server section 22. The device control section 235 uses SOAP to send the control instruction to the multifunction device 1.

The application section 25 is a block to perform processes in accordance with various applications. The application section 25 operates in accordance with, for example, an authentication application for determining whether or not a user has been registered in advance, a document management application for storing and managing image data, and an event tabulation application that performs tabulation of events executed by the multifunction device 1.

The cooperation module 24 is a module to connect the application section 25 with the MFP control logic section 23. The cooperation module 24 forwards an instruction from the application instruction section 236 to the application section 25, and also forwards an instruction from the application section 25 to the device control section 235.

(Multifunction Device)

Figure 7:
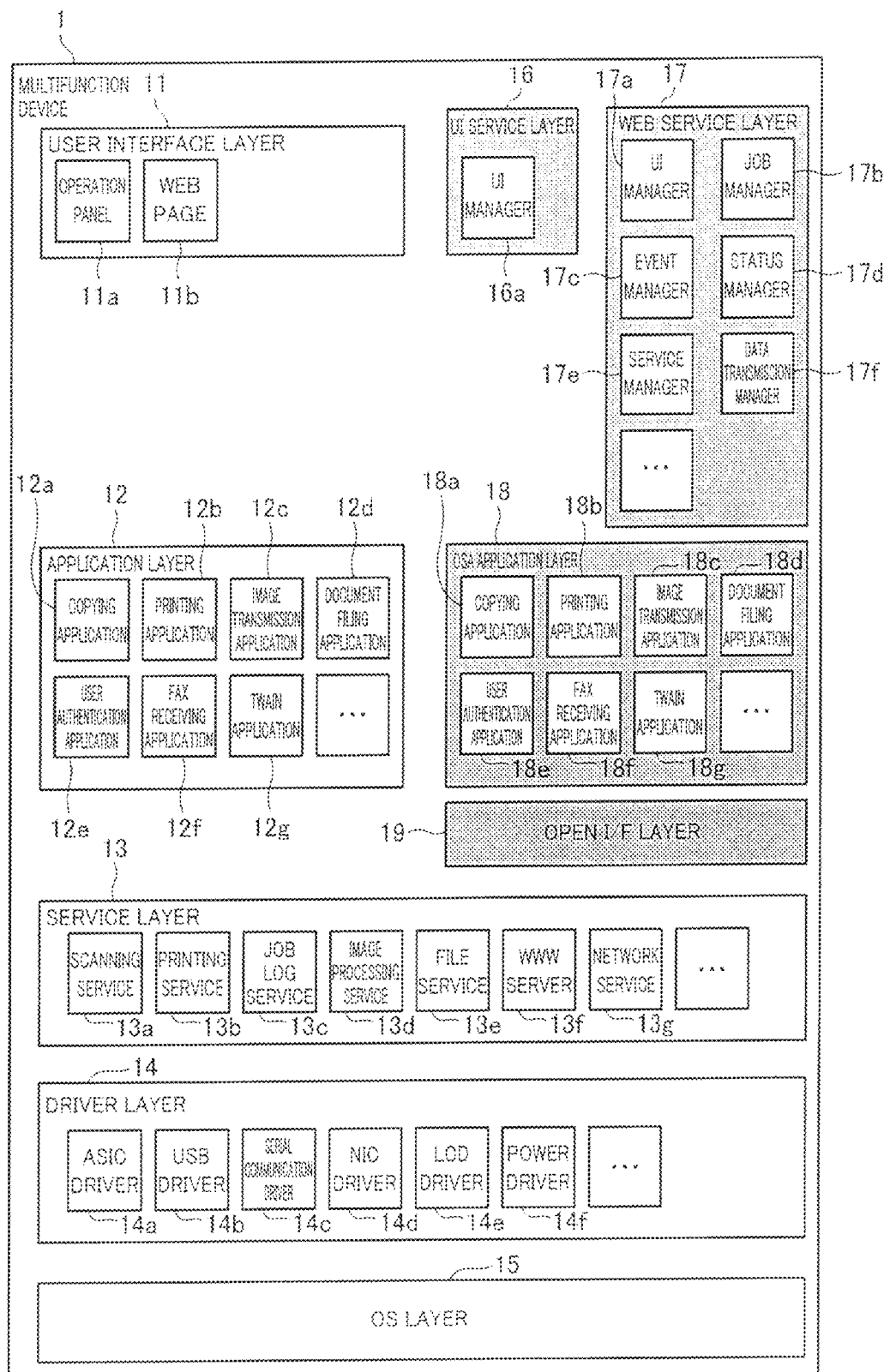
FIG. 7 relates to an embodiment of the present invention and is a block diagram showing a functional arrangement of a multifunction device.

The following will describe the internal arrangement of the multifunction device 1 with reference to the block diagram in FIG. 7. As shown in FIG. 7, the multifunction device 1 includes a user interface layer 11, an application layer 12, a service layer (function executing means, elemental function executing means) 13, a driver layer 14, an OS layer 15, a UI service layer (UI processing means, information notification means, operation screen identification information storage section, screen table storage section) 16, a Web service layer (control instruction receiving means) 17, an OSA application layer (function control means) 18, and an Open I/F layer (control command conversion means, command-corresponding information storage means) 19.

The user interface layer 11 is provided for allowing the user to operate the multifunction device 1. The user interface layer 11 stores an operation screen (unique operation screen) unique to each type of multifunction device 1, and causes the operation panel 6 to display the unique operation screen. The user inputs to the unique operation screen an instruction to execute a desired function, so as to control the multifunction device 1.

The user interface layer 11 has an operation panel section 11a that sends, to the application layer 12, information having been input to the operation screen of the multifunction device 1.

A Web page section 11b sends, to the application layer 12, information having been input to a Web page.

The application layer 12 operates in accordance with applications controlling various device functions of the multifunction device 1.

The device functions are realized by appropriately combining elemental functions such as a scanning function, printing function, image processing function, and network function and executing them, and each of the device functions is executed in response to an instruction by the user. Examples of the device functions are a copying function which is a combination of the scanning function, image processing function, and printing function, and an image transmission function which is a combination of the scanning function and network function. Hereinafter, the device functions are distinguished from the elemental functions.

The application layer 12 of the present embodiment includes applications such as: a copying application 12a for executing/controlling the printing function; a printing application 12b for executing/controlling the printing function; an image transmission application 12c for executing/controlling a function to transmit scanned image data to an external device (i.e. image transmission function); a document filing application 12d for executing/controlling a document filing function; a user authentication application 12e for executing/controlling a user authentication function; a facsimile receiving application 12f for executing/controlling a facsimile receiving function; and a TWAIN application 12g for executing/controlling a TWAIN function.

The service layer 13 is provided directly below the application layer 12, and controls various elemental functions of the multifunction device 1 in response to instructions from the application layer 12.

The service layer 13 of the present embodiment has elemental functions such as: a scanning service 13a for controlling scanning; a printing service 13b used by the printing function, copying function, and the like; a job log service 13c for controlling information management of each job; an image processing service 13d for controlling image formation such as graphics formation; a file service 13e for controlling image management such as document filing; a WWW server service 13f for controlling remote access via a Web page; and a network service 13g for controlling communication operations utilizing LAN, telephone lines, or the like.

The driver layer 14 is provided directly below the service layer 13, and operates in accordance with software for controlling the hardware of the multifunction device 1.

The driver layer 14 of the present embodiment has drivers such as: an ASIC driver 14a related to image formation; a USB driver 14b for performing USB communications; a serial communication driver 14c for performing serial communications; a NIC driver 14d for LAN communications; a LCD driver 14e for controlling the display on the operation panel 6; and a power driver 14f for power management.

The OS layer 15 is provided directly below the driver layer 14 and constitutes the operating system.

The user interface layer 11, application layer 12, service layer 13, driver layer 14, and OS layer 15 operate in accordance with software unique to each type of the multifunction device 1, and hence those layers are different among different types of the multifunction devices 1. With those layers, the multifunction device 1 can directly receive instructions from the user without the intermediary of the communications network, and can operate in accordance with the instructions.

In case where only those layers unique to the multifunction device 1 are provided, it is required to incorporate a new application or the like into the multifunction device 1 to perform control using the new application, and this requirement is troublesome. In consideration of this problem, the multifunction device 1 of the present embodiment is provided with a layer which can accept control from an external control device 2 and can cooperate with an application of the control device 2, as described below.

The UI service layer 16 obtains operation screen data from the control device 2, by means of HTTP (or HTTPS), and causes the operation panel 6 to display an operation screen corresponding to the obtained operation screen data. The UI service layer 16 may function as a general-purpose Web browser.

The UI service layer 16 and the user interface layer 11 allows the user to use a normal operation mode and an open system mode. In the normal operation mode, an operation screen (displayed by the user interface layer 11) unique to the multifunction device 1 is operated so that a function corresponding to the operation is executed by the multifunction device 1. The open system mode uses a network resource (e.g. application of RCD).

The UI service layer 16 is provided with a UI manager 16a which controls how the UI (operation screen) supplied from the control device 2 is displayed.

The UI service layer 16 stores address information (e.g. the IP address of the control device 2 and the URL, of the Web server, which is disclosed by the control device 2), and sends, by means of HTTP (or HTTPS), transmission request information (request information) which requests operation screen data, to the control device 2 specified by the address information. The UI manager 16a then instructs the operation panel 6 to display the operation screen based on the operation screen data which has been supplied in response. In this manner, the UI manager functions as UI processing means that receives data of an operation screen from the control device 2 and instructs the operation panel 6 to display the operation screen corresponding to the supplied data.

Also, The UI manager 16a sends, to the control device 2 and by means of HTTP (or HTTPS), push button information which indicates the button having been pushed on the operation screen, obtains new operation data in response to the push button information, and causes the operation panel 6 to display the operation screen corresponding to the data. In short, the UI manager 16a functions as information notification means which notifies the control device 2 of various types of information obtained from the user.

The Web service layer 17 receives a control instruction from the control device 2 by means of SOAP, and calls an appropriate application of the OSA application layer 18, which application corresponds to the control instruction. Also, the Web service layer 17 generates a SOAP command indicating the information supplied from the OSA application layer 18, and sends the SOAP command to the control device 2. The Web service layer 17 stores control instructions in association with modules of the OSA application layer 18, which modules correspond to the respective types of control indicated by the control instructions. An appropriate module is called in accordance with the stored contents.

The Web service layer 17 of the present embodiment includes: a job manager 17b which deals with a UI manager 17a for processing Web services in regard of UI control; a job manager 17b for processing Web services in regard of job control; an event manager 17c for processing Web services in regard of an event transmission request; a status manager 17d for processing Web services in regard of status control of jobs and devices; a service manager 17e for registering information in regard of the OSA application layer 18; a data transmission manager 17f for processing Web services in regard of transmission and reception of jobs; and the like.

The OSA application layer 18 is an application to control the aforesaid device functions, and outputs, to the Open I/F layer 19, first APIs (first control commands) included in the control instruction from the control device 2. As described later, APIs available in (disclosed to) the Open I/F layer 19 do not depend on the type of the multifunction device 1. On this account, the OSA application layer 18 is not required to change the program codes to support different types of multifunction devices 1.

The OSA application layer 18 of the present embodiment includes: a copying application 18a for executing/controlling the copying function; a printing application 18b for executing/controlling the copying function; an image transmission application 18c for executing/controlling a function to transmit scanned image data to an external device (i.e. image transmission function); a document filing application 18d for executing/controlling the document filing function; a user authentication application 18e for executing/controlling the user authentication application; a facsimile receiving application 18f for executing/controlling the facsimile receiving function; a TWAIN application 18g for executing/controlling the TWAIN function; or the like.

The Open I/F layer 19 discloses first APIs for controlling the service layer 13 to the OSA application layer 18, and converts the first APIs (first control commands) supplied from the OSA application layer 18 into second APIs (second control commands) that the service layer 13 can accept.

The Open I/F layer 19 is provided with a command conversion table storage section (command conversion table storage means; not illustrated) which stores a command conversion table (command corresponding information) in which first APIs (first control commands) supplied from the OSA application layer 18 are associated with the respective second APIs (second control commands). In accordance with the conversion table, the Open I/F layer 19 calls APIs of the service layer 13. FIG. 8 shows an example of the command conversion table stored in the Open I/F layer 19.

In the Open I/F layer 19, the first APIs disclosed to the OSA application layer 18 are shared among all types of the multifunction devices 1. As a result of this, a method which is disclosed to external devices by the Web service layer 17 can be commonly defined irrespective of the types of the multifunction devices 1, without changing the program codes of the OSA application layer 18. In other words, the control device 2 can control the Web service layer 17 by means of a common method, irrespective of the types of the multifunction devices 1.

Figure 9:
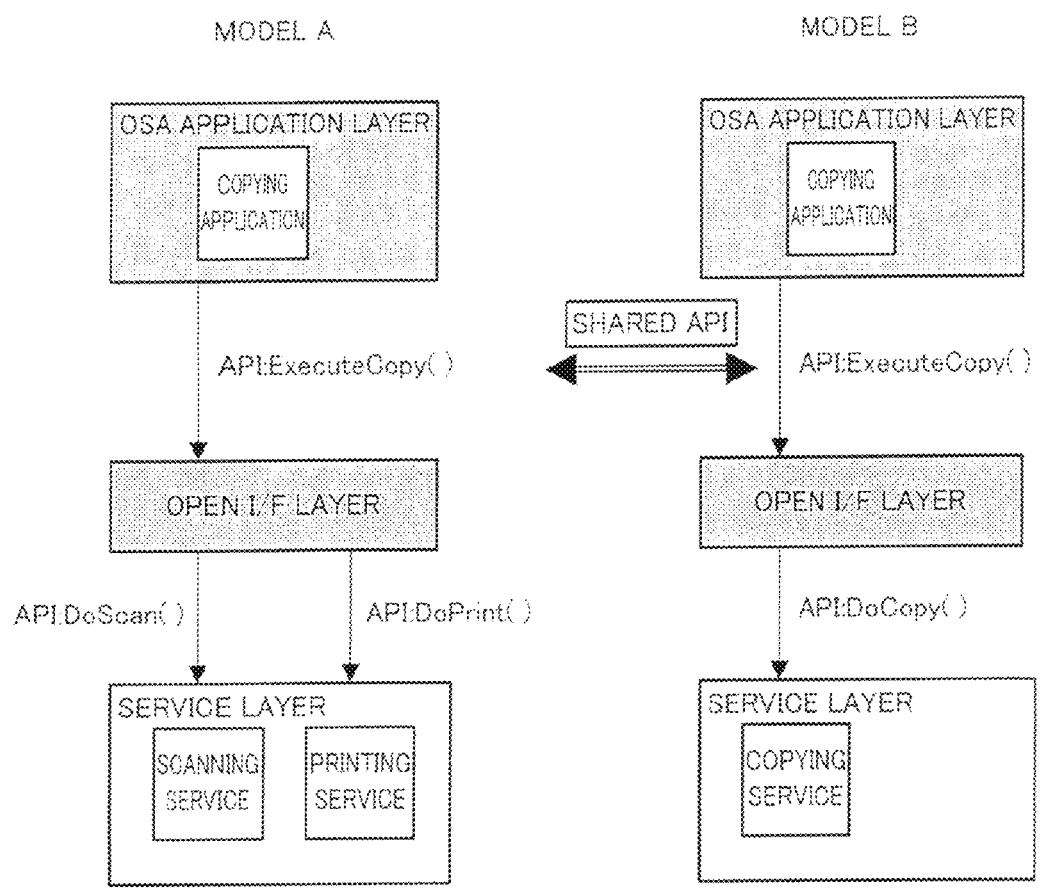
FIG. 9 relates to an embodiment of the present invention and illustrates how an Open I/F layer functions.

FIG. 9 illustrates the functions of the Open I/F layer 19. In this figure, a model-A multifunction device 1 has a scanning service 13a and a printing service 13b, as the service layer 13. In such a case, as a command corresponding table, the Open I/F layer 19 of the model-A multifunction device 1 stores the first API (first control command) 'Execute Copy' in association with the second APIs (second control commands) 'Do Scan' and 'Do Print'. Therefore, receiving the first API (first control command) 'Execute Copy', the Open I/F layer 19 causes the multifunction device 1 to perform the scanning service 13a and printing service 13b in accordance with the second APIs (second control commands) as a result of the conversion.

On the other hand, a model-B multifunction device 1 has a copying service as the service layer 13. In this case, as a command corresponding table, the Open I/F layer 19 of the model-B multifunction device 1 stores a first API (first control command) 'Execute Copy' in association with a second API (second control command) 'Do Copy'. Therefore, receiving the first API (first control command) 'Execute Copy', the Open I/F layer 19 causes the multifunction device 1 to execute the copying service in accordance with the second API (second control command) as a result of the conversion.

As described above, the Open I/F layer 19 allows the control device 2 and the OSA application layer 18 to instruct the execution of the copying using the shared API (control command) 'Execute Copy', irrespective of the types of the multifunction devices. That is, the control device 2 and the OSA application layer 18 can instruct the execution of services using shared control instructions and first APIs (first control commands), even if the service layers are different among different types of the multifunction devices 1. It is therefore unnecessary to use different control instructions and first APIs (first control commands) corresponding to the respective types of the multifunction devices 1, and hence programs for the control device 2 and the OSA application layer 18 can be easily developed.

(Overall Operation of Multifunction Device Control System)

Figure 10:
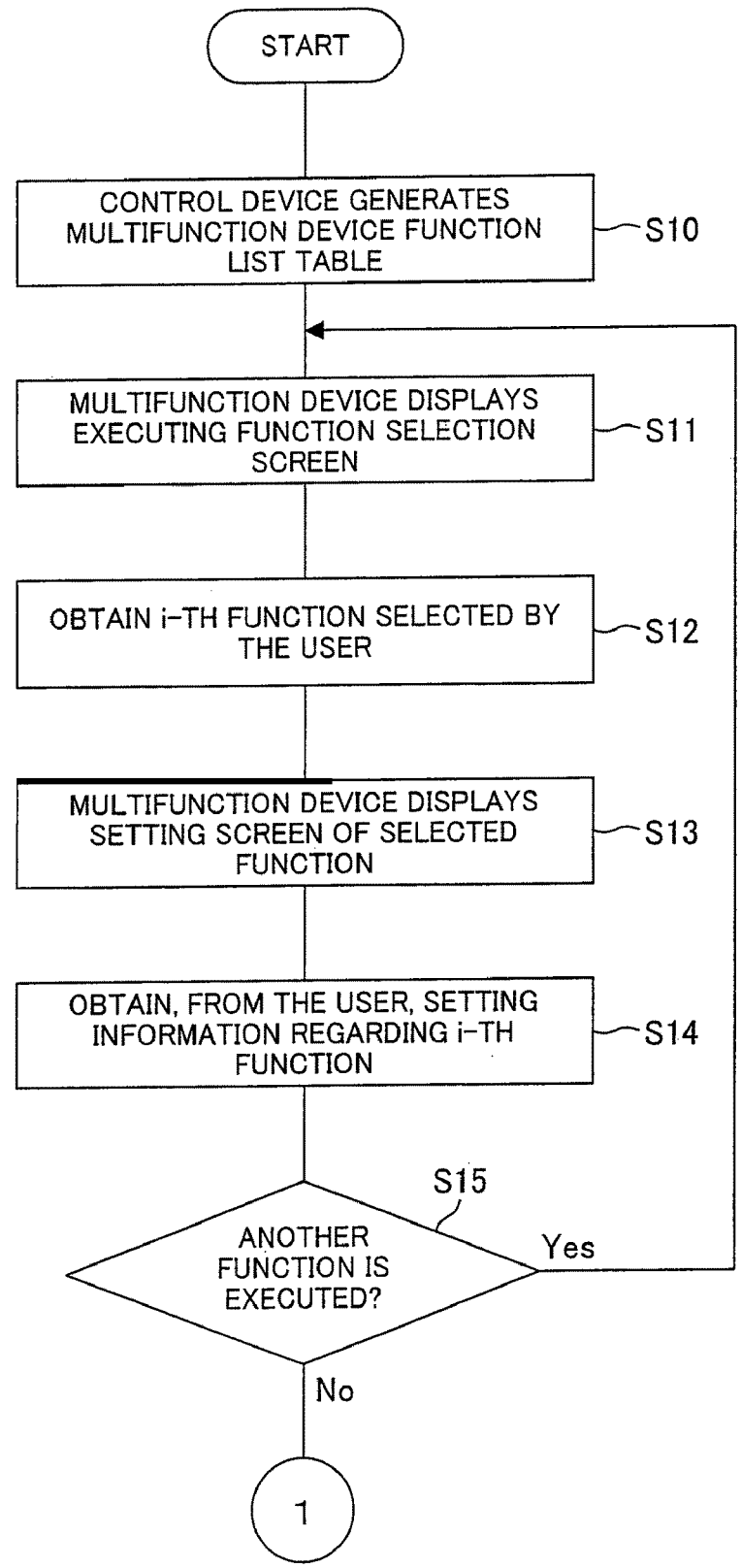
FIG. 10 relates to an embodiment of the present invention and is a flowchart showing the first half of an overall operation of a multifunction device control system.
Figure 11:
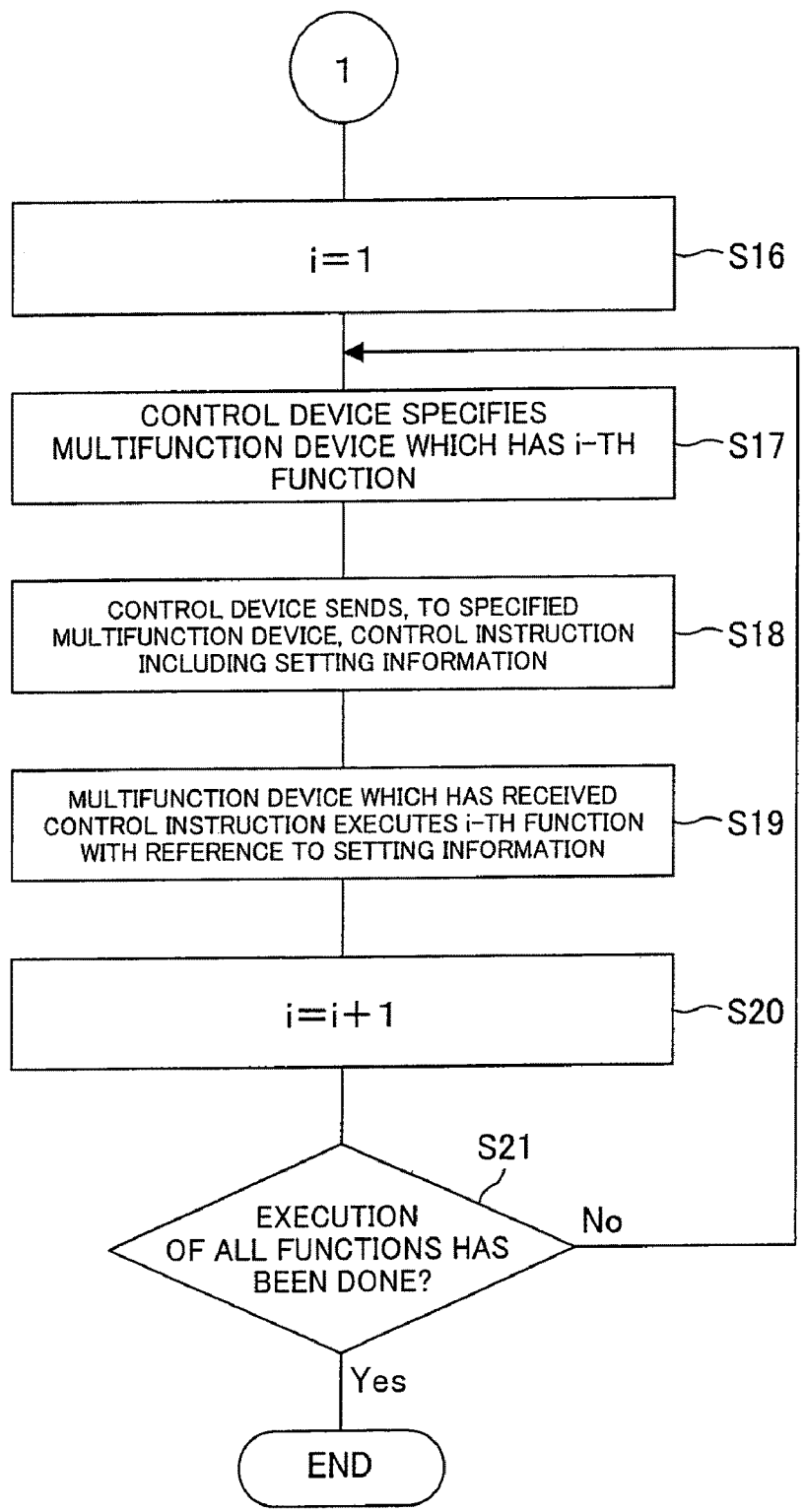
FIG. 11 relates to an embodiment of the present invention and is a flowchart showing the second half of the overall operation of the multifunction device control system.

The following now outlines the operation of the multifunction device control system. FIGS. 10 and 11 are flowcharts outlining the operation of the multifunction device control system of the present embodiment.

As shown in FIG. 10, first of all, the function list generation section 239 of the control device 2 obtains the lists of executable functions from all multifunction devices 1. The function list generation section 239 then associates the list information with identification information of a multifunction device that has received the list information, and stores, as a multifunction device function list table, the associated information in the multifunction device function list table storage section 237 of the control device 2 (S10). Details of this step will be given later.

Subsequently, the UI manager 16a of the multifunction device 1 requests the control device 2 to supply data of an executing function selection screen. Then the UI control section 233 of the control device 2 searches the screen data storage section 232 for the data of the executing function selection screen and sends the data to the multifunction device 1. In response, the UI manager 16a of the multifunction device 1 instructs the operation panel 6 to display the executing function selection screen corresponding to the supplied data (S11). The executing function selection screen shows selection items indicating respective functions of the multifunction devices 1 on the network, and prompts the user to select a function to be executed.

Thereafter, the user selects, using the operation panel 6, the function to be executed, with reference to the executing function selection screen displayed on the operation panel 6 of the multifunction device 1. In response, the UI manager 16a of the multifunction device 1 obtains, through the operation panel 6, push button information by which the function selected by the user is specified (S12). This push button information is used as selected function information indicating the function selected by the user. The UI manager 16a of the multifunction device 1 then sends, as the selected function information, the push button information to the control device 2. The information receiving section 231 of the control device 2 receives the selected function information through the intermediary of the Web server section 22, and outputs the selected function information to the UI control section 233.

Then the UI control section 233 of the control device 2 supplies, to the multifunction device 1, the data of a setting screen which prompts the user to input setting information regarding the function indicated by the supplied selected function information. The UI manager 16a of the multifunction device 1 then instructs the operation panel 6 to display the setting screen corresponding to the supplied data (S13).

Subsequently, the user inputs, using the operation panel 6, the setting information in regard of the function selected in S12, with reference to the setting screen displayed on the operation panel 6 of the multifunction device 1. As a result, the UI manager 16a of the multifunction device 1 obtains the setting information regarding the function selected in S12 (S14). The UI manager 16a of the multifunction device 1 then sends the obtained setting information to the control device 2.

If it is instructed to execute another function, the process returns to the step S11. If the execution of required functions has all been instructed, the process proceeds to the step S16 shown in FIG. 11. With these steps, the control device 2 obtains one or more pairs of information for specifying a function to be executed and setting information regarding the function to be executed. Details of the steps S11-S14 will be given later.

Thereafter, as shown in FIG. 11, the multifunction device specifying section 238 of the control device 2 sets a variable i, which indicates the number of functions to be executed, at 1 (S16). Then the multifunction device specifying section 238 specifies the multifunction device 1 having the i-th function, with reference to the multifunction device function list table stored in the multifunction device function list table storage section 237 (S17). The specified multifunction device 1 executes the i-th function.

For example, in case where the multifunction device operated by the user has the i-th function, that multifunction device operated by the user is specified by the multifunction device specifying section 238. On the other hand, in case where not the multifunction device operated by the user but another multifunction device has the i-th function, said another multifunction device 1 is specified by the multifunction device specifying section 238.

In case where a plurality of multifunction devices having the i-th function are specified, one of these multifunction devices is selected by a method so that the function is executed by the selected multifunction device. In doing so, the multifunction device operated by the user may be preferentially selected in case where that multifunction device is included in the specified multifunction devices.

Then the device control section 235 of the control device 2 receives the identification information of the multifunction device 1 specified by the multifunction device specifying section 238, and sends, to the specified multifunction device, a control instruction including the setting information which has been supplied in S14 (S18). As described above, this control instruction is generated with reference to the control instruction table stored in the control instruction table storage section 234.

Subsequently, in the multifunction device 1 having received the control instruction, the job manager 17b calls an appropriate module of the OSA application layer 18 in response to the control instruction. As a result, the OSA application layer 18 of the multifunction device 1 controls the services of the service layer 13 through the intermediary of the Open I/F layer 19, and the services of the service layer 13 execute the function (S19). The function is executed based on the setting information in the control instruction.

Then the control device 2 increments the variable i (S20). If the execution of all functions has not been completed, the process goes back to the step S17 and the steps S17-S20 are repeated until the execution of all functions is completed. If the execution of all functions has been completed, the process finishes in the step S21.

(Generation of Multifunction Device Function List Table)

Figure 12:
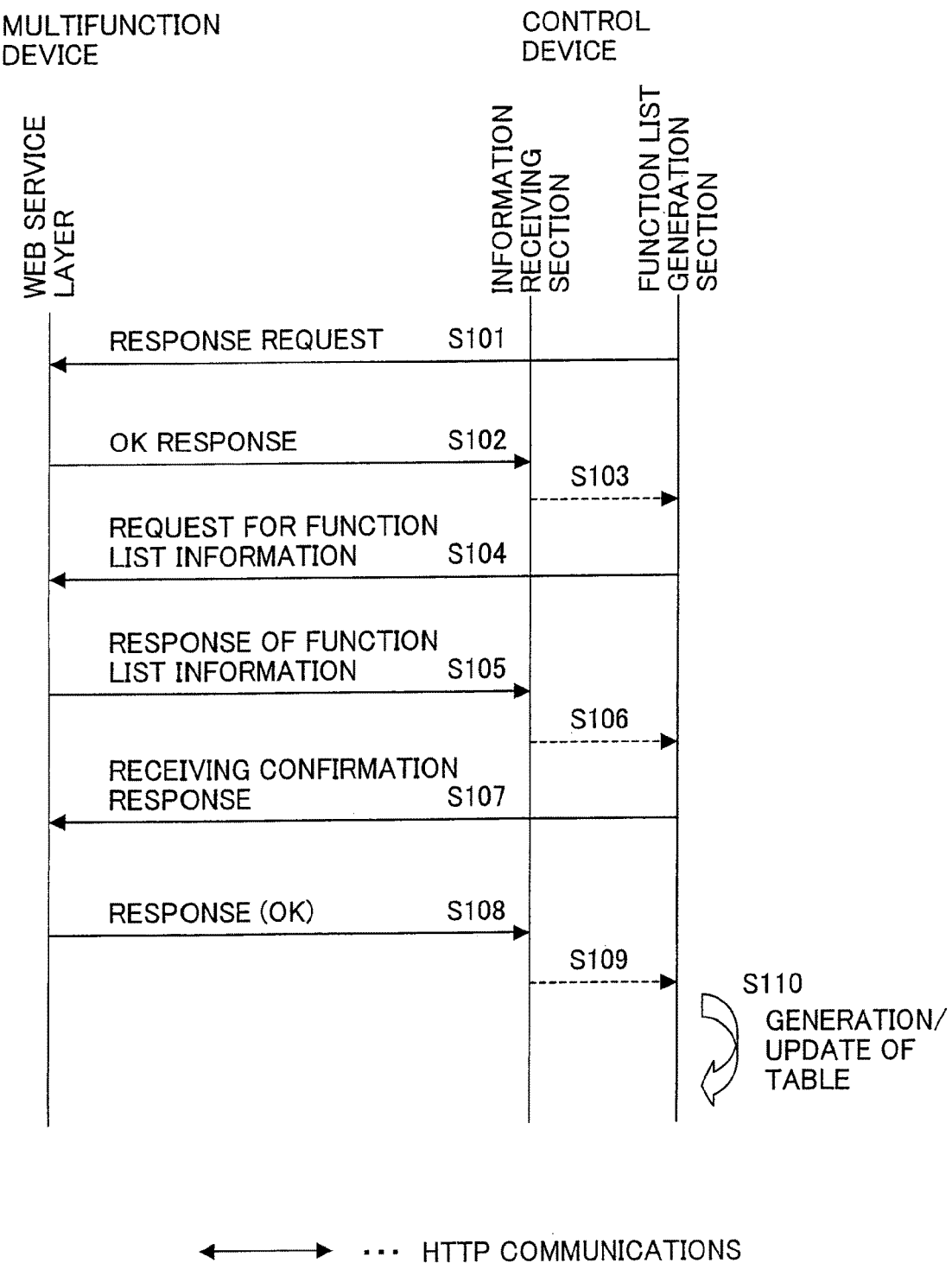
FIG. 12 relates to an embodiment of the present invention and illustrates timings of interactions between the multifunction device and the control device when the multifunction device function list table is generated.

Details of the foregoing step S10 shown in FIG. 10 will be given below. FIG. 12 shows a timing chart at the time of generating the multifunction device function list table.

As shown in FIG. 12, first of all, the function list generation section 239 of the control device 2 sends response requests to all multifunction devices 1 on the network (S101). Receiving the response requests, the multifunction devices 1 return OK responses to the control device 2 (S102). Receiving the OK responses, the information receiving section 231 of the control device 2 sends the OK responses to the function list generation section 239 (S103). The function list generation section 239 recognizes, with reference to the supplied OK responses, the number and locations of the multifunction devices 1 on the network.

Subsequently, the function list generation section 239 sends function list information requests to all of the multifunction devices 1 having sent the OK responses (S104). In the Web service layer 17 of the multifunction device 1 having received the function list information request, the status manager 17d generates a list of functions of the multifunction device 1 with reference to a storage section (not illustrated) or the like, and returns the information of this list to the control device 2 (S105).

Then in the control device 2 having received the function list information, the information receiving section 236 sends the supplied function list information to the function list generation section 239. Subsequently, the function list generation section 239 sends, to the multifunction devices 1, receiving confirmation responses each indicating that the function list information has been supplied (S107).

In response to this, the status manager 17d of the multifunction device 1 returns the OK response to the control device (S108). In the control device 2 having received the OK response, the information receiving section 231 sends the OK response to the function list generation section 239 (S109).

After receiving the OK responses from all of the multifunction devices 1 on the network, the function list generation section 239 associates the sets of function list information supplied from the respective multifunction devices 1 with sets of identification information and locations (IP addresses) of the multifunction devices, generates/updates the multifunction device function list table shown in FIG. 5, and stores the generated table in the multifunction device function list table storage section 237 (S110).

In the steps S101-S109, the communications between the control device 2 and the multifunction devices 1 are performed by means of HTTP.

As described above, the lists of functions of the multifunction devices are tabulated so that the multifunction device function list table showing the functions of each multifunction device is generated. The multifunction device function list table may be generated/updated in response to an instruction from the user or may be automatically generated/updated at a regular frequency (e.g. once in a day).

(Operation Screen Display and User Input)

Figure 13:
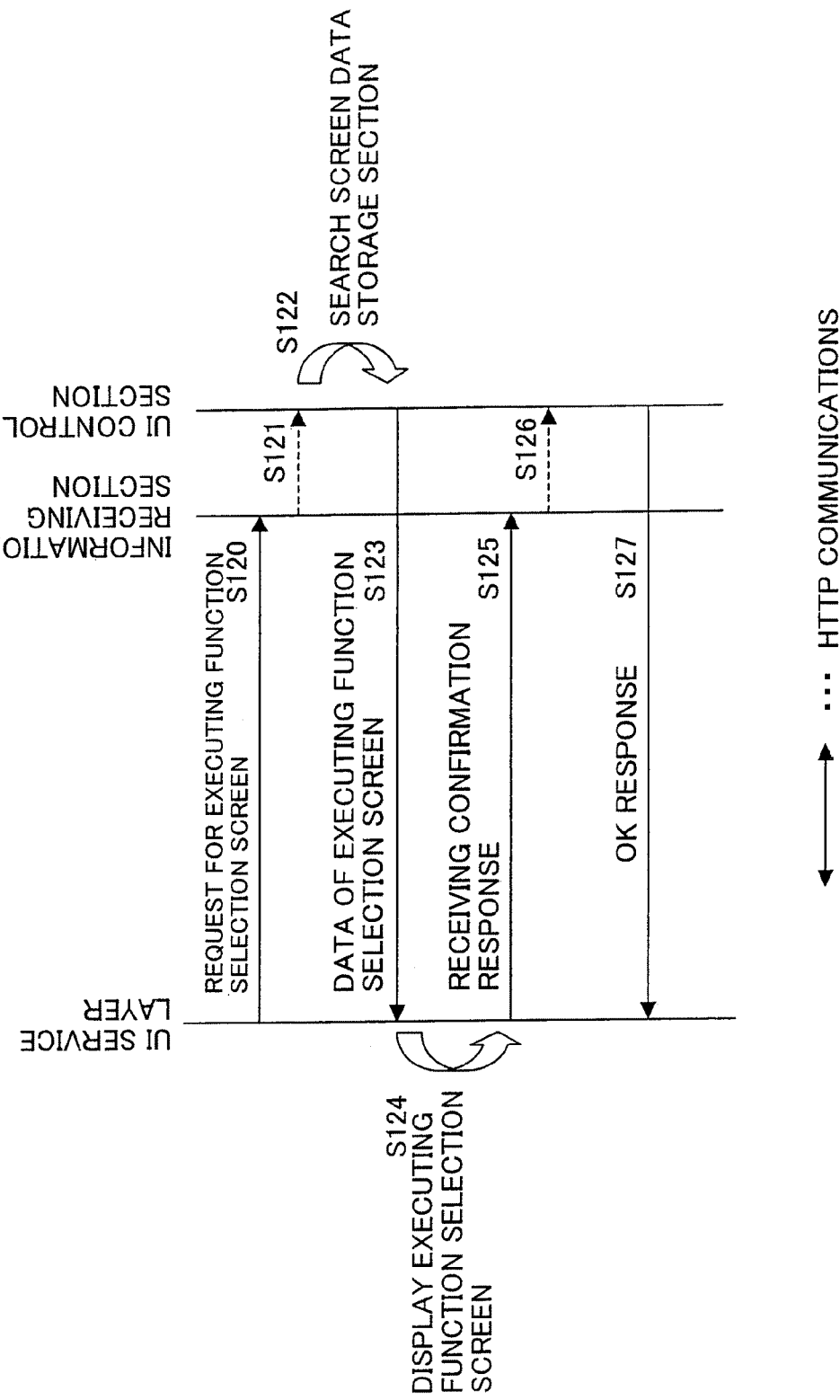
FIG. 13 relates to an embodiment of the present invention and illustrates timings of interactions between the multifunction device and the control device when the multifunction device displays an executing function selection screen.

Details of the foregoing steps S11-S14 shown in FIG. 10 will be given. First, the step S1 will be detailed. FIG. 13 is a timing chart when the multifunction device 1 displays the executing function selection screen.

As shown in FIG. 13, first of all, the UI manager 16a of the UI service layer 16 of the multifunction device 1 sends, to the control device 2, an executing function selection screen request which requests the data of the executing function selection screen (S120). Receiving this executing function selection screen request, the information receiving section 231 sends the supplied request to the UI control section 233 (S121).

In response to this, the UI control section 233 searches the screen data storage section 232 for the data of the executing function selection screen (S122). The UI control section 233 then sends, to the multifunction device 1, the data of the executing function selection screen (S123).

In doing so, the UI control section 233 preferably sends, to the multifunction device 1, the data of the executing function selection screen in which the functions of all multifunction devices on the network are shown as selection items, with reference to the multifunction device function list table storage section 237. As a result of this, the executing function selection screen shows selection items for the functions of all multifunction devices on the network, even if each multifunction device does not have all of the functions shown in the screen. Those functions which are owned by none of the multifunction devices on the network are not displayed as selection items.

Subsequently, in the UI service layer 16 of the multifunction device 1 having received the data of the executing function selection screen, the UI manager 16a instructs the operation panel 6 to display the executing function selection screen corresponding to the supplied data (S124).

Figure 17:
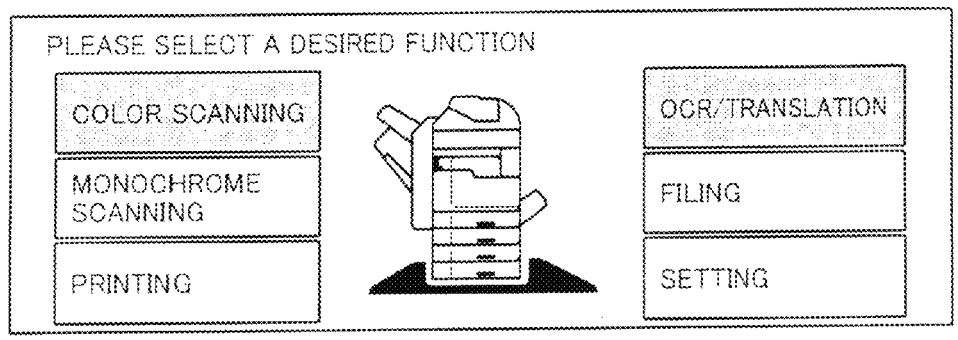
FIG. 17 relates to an embodiment of the present invention and shows an example of an executing function selection screen displayed on a monochrome low-resolution operation panel.
Figure 20:
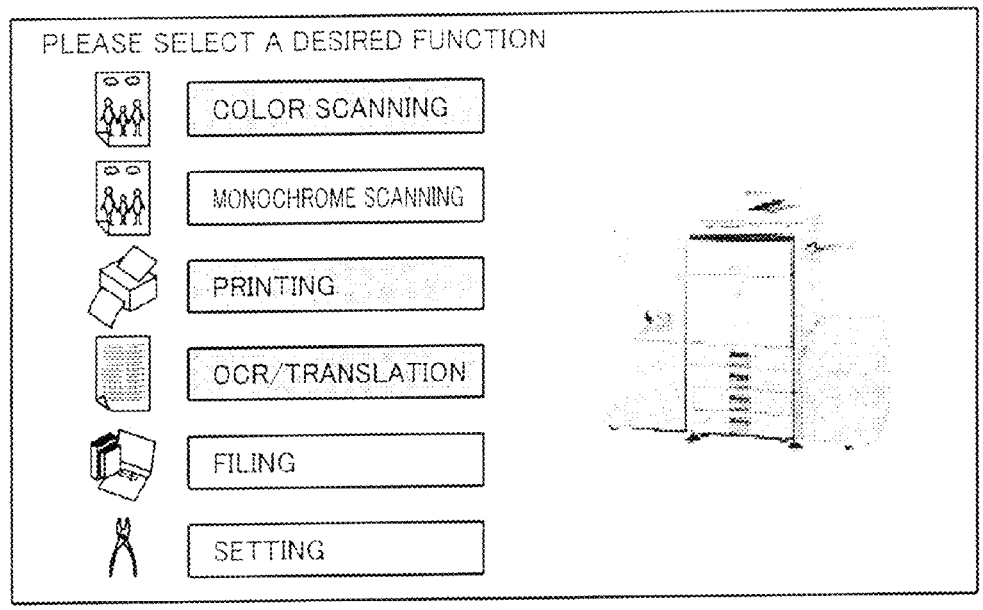
FIG. 20 relates to an embodiment of the present invention and shows an example of an executing function selection screen displayed on a color high-resolution operation panel.

FIGS. 17 and 20 show examples of the executing function selection screen displayed on the operation panel 6. As shown in these figures, it is possible on the executing function selection screen to select a color scanning function, monochrome scanning function, printing function, OCR/translation function, filing function, and setting function. As shown in the figures, the UI manager 16a may gray out those selection items which are not executable by the multifunction device 1 operated by the user. Even in such a case, the user can select the grayed-out selection items.

Thereafter, the UI manager 16a sends, to the control device 2, a receiving confirmation response indicating that the data of the executing function selection screen has been supplied (S125). Receiving the receiving confirmation response, the information receiving section 231 of the control device 2 sends the supplied response to the UI control section 233 (S126). The UI control section 233 having received the receiving confirmation response returns an OK response to the multifunction device 1 (S127).

Figure 14:
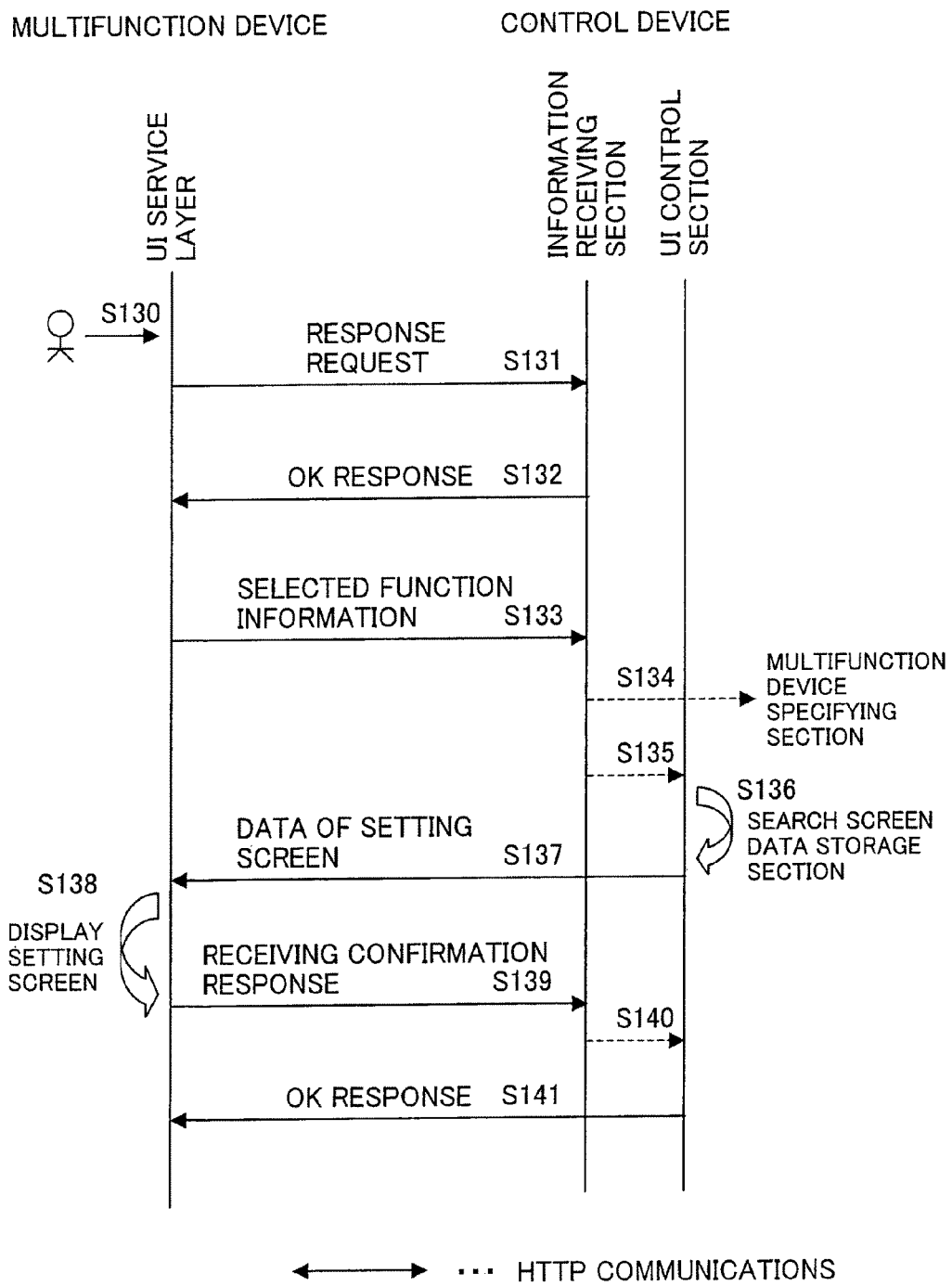
FIG. 14 relates to an embodiment of the present invention and illustrates timings of interactions between the multifunction device and the control device when the user selects an executing function and the multifunction device display a setting screen for the selected function.

Details of the steps S12 and S13 shown in FIG. 10 will be given. FIG. 14 shows a timing chart when the user selects a function to be executed and the multifunction device 1 displays a setting screen in regard of the selected function.

First, the user selects, using the operation panel 6, a function to be executed, with reference to the executing function selection screen displayed on the operation panel 6 of the multifunction device 1. In this way, the UI manager 16a of the UI service layer 16 of the multifunction device 1 obtains, from the user, the identification information of the function to be executed, through the intermediary of the operation panel 6 (S130).

Subsequently, the UI manager 16a sends a response request to the control device 2 (S131). Receiving the response request, the information receiving section 231 returns an OK response to the multifunction device 1 (S132).

The UI manager 16a of the multifunction device 1 then sends, to the control device 2, the identification information of the function to be executed. The information has been obtained from the user and supplied to the control device 2 as selected function information (S133). Receiving the selected function information, the information receiving section 231 of the control device 2 sends the selected function information to the multifunction device specifying section 238 and the UI control section 233 (S134, S135).

Thereafter, the UI control section 233 searches the screen data storage section 232 for the data of a setting screen which prompts the user to input setting information in regard of the function indicated by the supplied selected function information (S136). The UI control section 233 then sends the data of the setting screen to the multifunction device 1 (S137).

Then in the UI service layer 16 of the multifunction device 1 having received the data of the setting screen, the UI manager 16a instructs the operation panel 6 to display the setting screen corresponding to the supplied data (S138).

Figure 18:
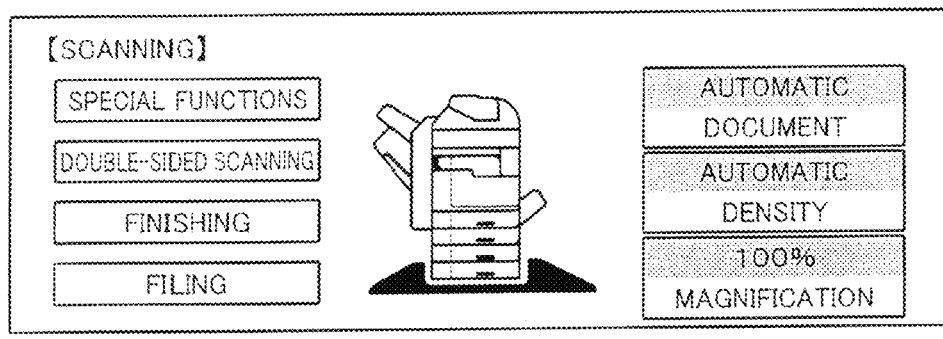
FIG. 18 relates to an embodiment of the present invention and shows an example of a setting screen for a scanning function, which screen is displayed on a monochrome low-resolution operation panel.
Figure 19:
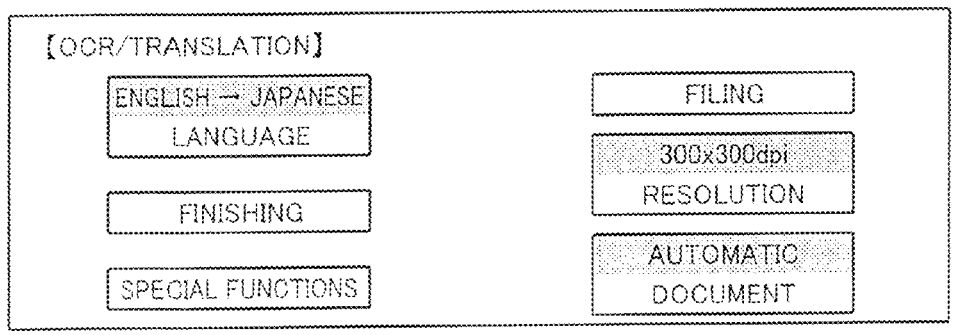
FIG. 19 relates to an embodiment of the present invention and shows an example of a setting screen for an OCR/translation function, which screen is displayed on a monochrome low-resolution operation panel.
Figure 21:
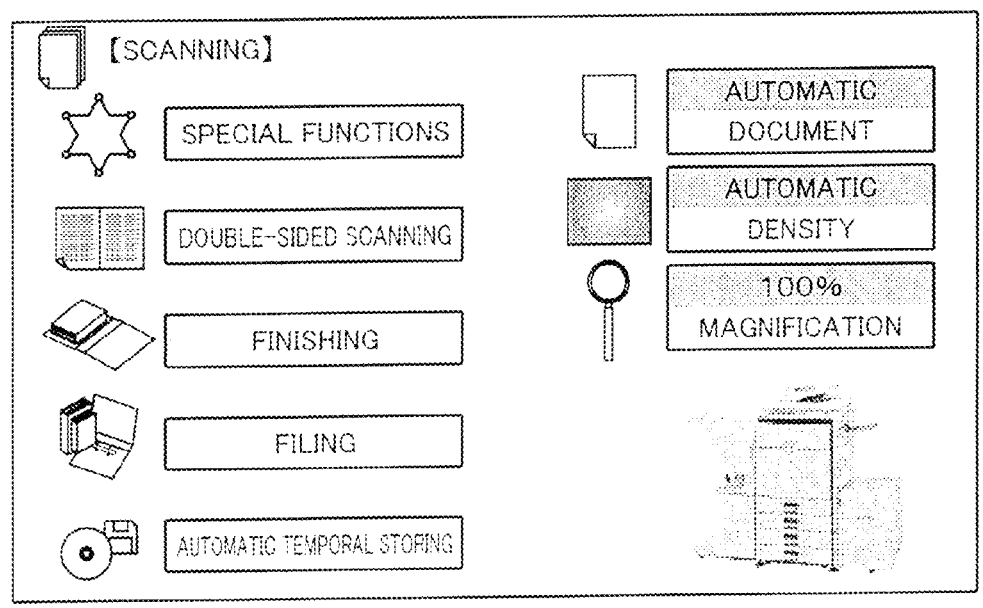
FIG. 21 relates to an embodiment of the present invention and shows an example of a setting screen for a scanning function, which screen is displayed on a color high-resolution operation panel.
Figure 22:
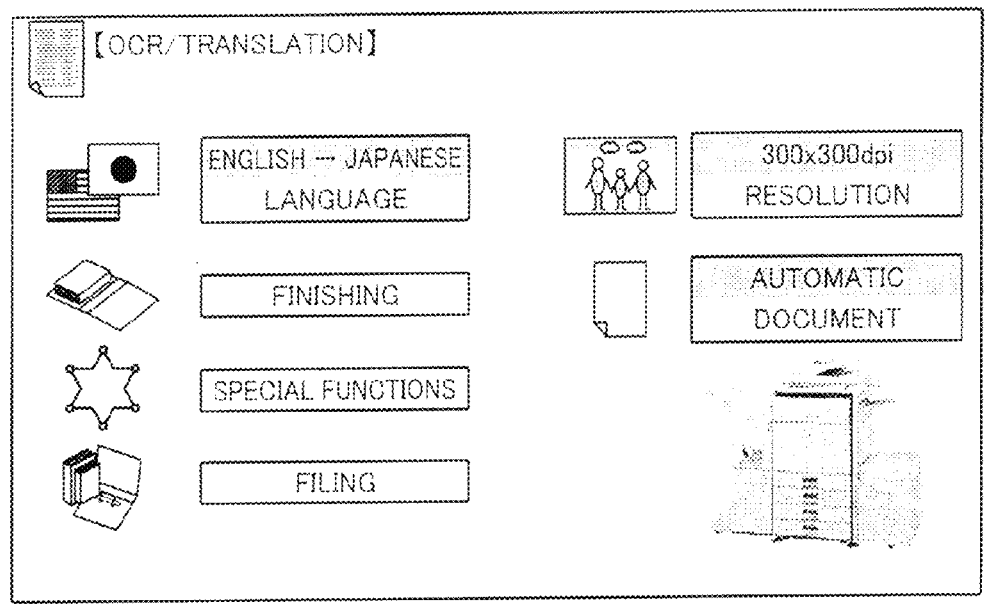
FIG. 22 relates to an embodiment of the present invention and shows an example of a setting screen for an OCR/translation function, which is displayed on a color-high-resolution operation panel.

FIGS. 18 and 21 show an example of the setting screen in regard of the scanning function, which screen is displayed when the scanning function is selected. As shown in these figures, in regard of the scanning function, it is possible to perform setting concerning a special function, double-sided scanning, finishing, filing, automatic temporal storing, document, density, and magnification. FIGS. 19 and 22 also show examples of the setting screen in regard of the OCR/translation function, which screen is displayed when the OCR/translation function is selected. As shown in these figures, in regard of the OCR/translation function, it is possible to perform settings concerning a language, finishing, special function, filing, resolution, and document.

Thereafter, the UI manager 16a sends, to the control device 2, a receiving confirmation response indicating that the data of the executing function selection screen has been supplied (S139). Receiving the receiving confirmation response, the information receiving section 231 of the control device 2 sends the supplied response to the UI control section 233 (S140). The UI control section 233 having received the receiving confirmation response returns an OK response to the multifunction device 1 (S141).

Figure 15:
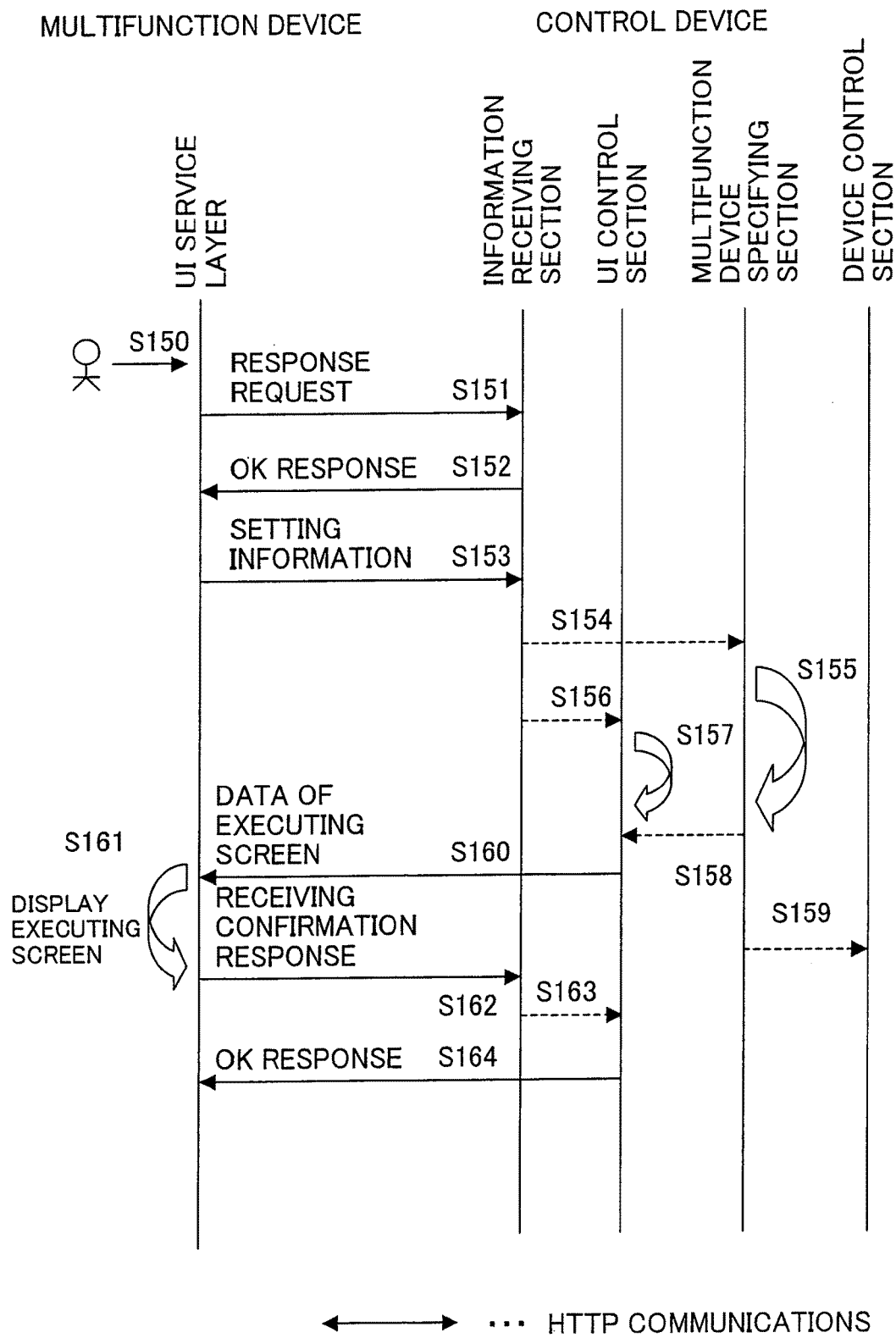
FIG. 15 relates to an embodiment of the present invention and illustrates timings of interactions between the multifunction device and the control device when the user inputs setting information.

Details of the step S14 shown in FIG. 10 will be given. FIG. 15 shows a timing chart when the user inputs setting information.

First, in reference to the setting screen displayed on the operation panel 6 of the multifunction device 1, the user inputs, using the operation panel 6, the setting information regarding a function to be executed. In this way, the UI manager 16a of the UI service layer 16 of the multifunction device 1 obtains, from the user, the setting information in regard of the function to be executed, through the intermediary of the operation panel 6 (S150).

The UI manager 16a then sends a response request to the control device 2 (S151). The information receiving section 231 having received the response request returns an OK response to the multifunction device 1 (S152).

The UI manager 16a of the multifunction device 1 then sends, to the control device 2, the setting information obtained from the user (S153). The information receiving section 231 of the control device 2 having received the setting information sends the setting information to the multifunction device specifying section 238 (S154). Also, the UI manager 16a informs the UI control section 233 that the setting information has been supplied (S156).

Receiving the setting information, the multifunction device specifying section 238 searches the multifunction device function list table storage section 237 for a multifunction device which can execute the function indicated by the selected function information supplied in the step S134 shown in FIG. 14 (S155). The multifunction device specifying section 238 then sends, to the UI control section 233, the name and IP address (both indicated in the multifunction device function list table of FIG. 5) of the multifunction device which has been found (S158). Also, the multifunction device specifying section 238 sends, to the device control section 235, the IP address of the multifunction device which has been found, the selected function information supplied in the step S134, and the setting information supplied in the step S154 (S159).

On the other hand, the UI control section 233, which has been informed in the step S156 that the setting information was supplied from the information receiving section 231, searches the screen data storage section 232 for the data of the execution screen which is displayed at the time of executing the function (S157). Subsequently, in the step S158, the data of the execution screen showing the name and IP address of the multifunction device, which have been supplied from the multifunction device specifying section 238, is generated, and the generated screen is sent to the multifunction device 1 (S160).

In the UI service layer of the multifunction that received the data of the execution screen, the UI manager 16a instructs the operation panel 6 to display the execution screen corresponding to the data (S161).

Figure 23:
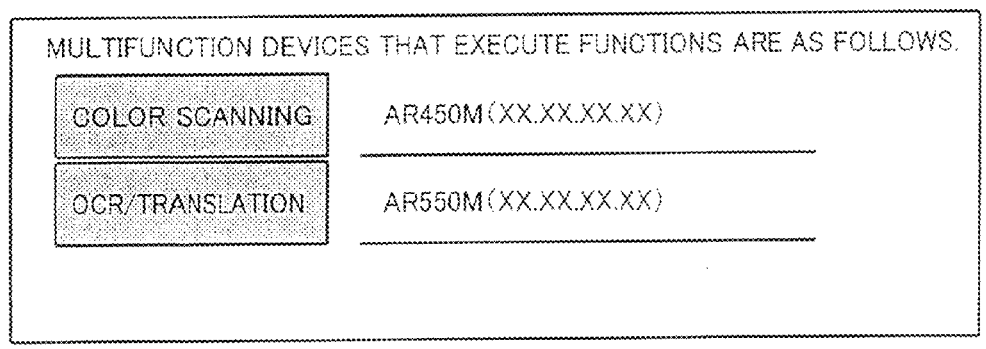
FIG. 23 relates to an embodiment of the present invention and shows an example of an executing screen.

FIG. 23 shows an example of the execution screen. In this figure, "XX. XX. XX. XX" indicates an IP address. As shown in FIG. 23, the execution screen lists the name of the function which has been instructed to be executed, the name of the multifunction device that executes the function, and the IP address of that multifunction device.

Thereafter, the UI manager 16a sends, to the control device 2, a receiving confirmation response that indicates the data of the execution screen has been received (S162). Receiving this receiving confirmation response, the information receiving section 231 of the control device 2 sends the receiving confirmation response to the UI control section 233 (S163). The UI control section 233 having received the receiving confirmation response returns an OK response to the multifunction device 1 (S164).

In the steps S120-S164, the communications between the control device 2 and the multifunction devices 1 are carried out by means of HTTP.

(Execution of Function)

Figure 16:
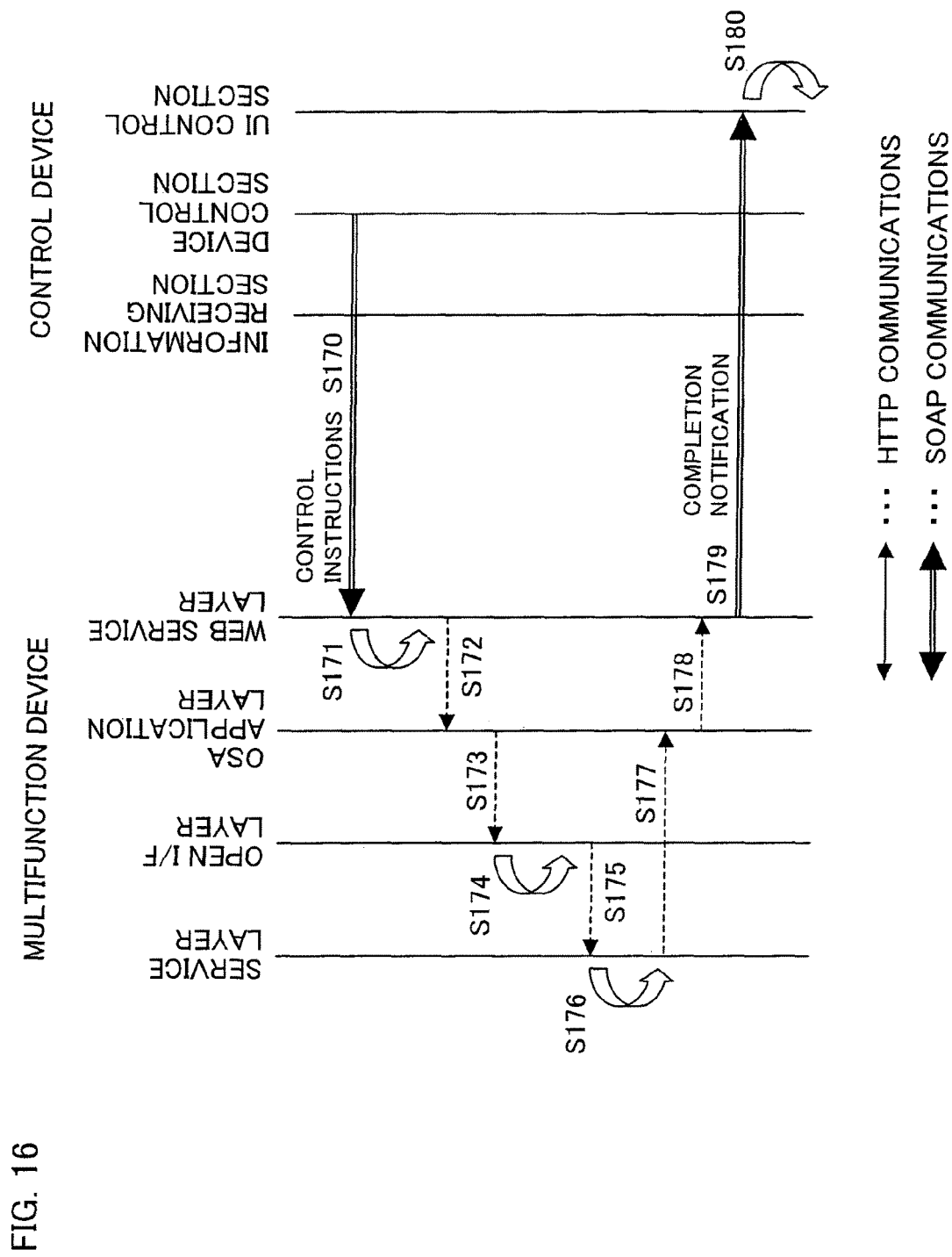
FIG. 16 relates to an embodiment of the present invention and illustrates timings of interactions between the multifunction device and the control device when the control device instructs the multifunction device to execute a function.

Now, details of the steps S17 to S19 shown in FIG. 11 will be given. FIG. 16 shows a timing chart when the control device instructs the multifunction device to execute a function.

First, the device control section 235 of the control device 2 generates a control instruction from the selected function information supplied in the step S159, with reference to the control instruction table stored in the control instruction table storage section 234. On this occasion, to the first APIs (first control commands) in the control instruction, a parameter based on the setting information is added. As a result, the control instruction generated by the device control section 235 includes the setting information. The device control section 235 then sends the generated control instruction to the multifunction device 1 which has the IP address having been supplied in the step S159 (S170).

In the Web service layer of the multifunction device 1 receiving the control instruction, the job manager 17b generates a job based on the control instruction (S171). The job manager 17b then calls an appropriate application from the OSA application layer 18, with reference to the control instruction. For example, in case where the control instruction supplied from the control device 2 instructs to execute the scanning function shown in FIG. 5, the job manager 17b calls the image transmission application 18c (S172).

The called application (image transmission application 18c in this case) of the OSA application layer 18 outputs, to the low-level Open I/F layer 19, the first API ('ExecuteScan' in this case) that the Open I/F layer 19 discloses to the outside (S173).

The Open I/F layer 19 reads out, from the command conversion table (see FIG. 5), the second control commands ('Do Scan', 'Save File', and 'Send By FTP' in this case) that the service layer 13 can accept and which correspond to the first API ('ExecuteScan in this case) supplied from the OSA application layer 18 (image transmission application 18c in this case) (S174). The Open I/F layer 19 then outputs the second APIs thus read out to the service layer 13, in the order as they are stored in the command conversion table (S175).

In response, each of the services (the scanning service 13a, the file service 13e, and the network service 13g in this case) of the service layer 13 executes elemental functions (the scanning service, file service, and network service in this case) in an appropriate order, in accordance with the second APIs (S176). In doing so, each of the services of the service layer 13 uses an appropriate module of the driver layer 14.

After the completion of the execution of the elemental functions, the service layer 13 notifies the application (image transmission application 18c in this case) of the OSA application layer 18 of the completion of the execution of the elemental functions (S177). Receiving this notification, the application (image transmission application 18c) of the OSA application layer 18 notifies the job manager 17b of the Web service layer 17 of the completion of the function (scanning function in this case) (S178).

Being notified of the completion of the execution of the function, the job manager 17b notifies the UI control section 233 of the control device 2 of the proper execution of the function (S179). Finally, the UI control section 233 which has received the notification sends, to the multifunction device 1 to which the user has instructed the execution of the function, the data of an image which notifies that the function has properly been executed. Receiving this data, the multifunction device 1 displays the notification image on the operation panel 6 (S180).

In the steps S170 to S179, the communications between the control device 1 and the multifunction devices 1 are carried out by SOAP.

(Process to Display Operation Screen)

Now, the following will discuss a process to display an operation screen by the UI service layer 16 of the multifunction device 1.

The operation screen data, which is supplied from the UI control section 233 of the control device 2 to the UI service layer 16 of the multifunction device 1, includes: screen style information (screen type information) indicating the screen style (screen type) of the operation screen; component type information indicating the types (e.g. title square button, radio button, and checkbox) of components (image components) constituting the operation screen; and sub information indicating texts on the components.

On the other hand, the UI manager 16a of the UI service layer 16 includes a screen table storage section (not illustrated) which stores the screen style information in association with component display information indicating the display types (shapes, sizes, etc.) and the positions of the components (e.g. title, square button, radio button, and checkbox) which constitute the screen defined by the screen style.

The UI manager 16a converts the supplied operation screen data into UI data suitable for the operation panel 6 of the multifunction device 1.

More specifically, the UI manager 16a extracts, from the operation screen data, the screen style information, the component type information, and the sub information.

The UI manager 16a then reads out, from the screen table storage section (not illustrated), the component display information corresponding to the screen style information extracted from the operation screen data, and determines the positions of the components in accordance with the order of the components in the operation screen data.

Also, the UI manager 16a reads out, from the screen table storage section (not illustrated), the component display information corresponding to the screen style information extracted from the operation screen data, and determines the display types of all components with reference to the component type information extracted from the operation screen data. Moreover, the UI manager 16a determines the texts displayed on the components, with reference to the sub information extracted form the operation screen data. The UI manager 16a then generates the UI data in accordance with these determinations.

Figure 24:
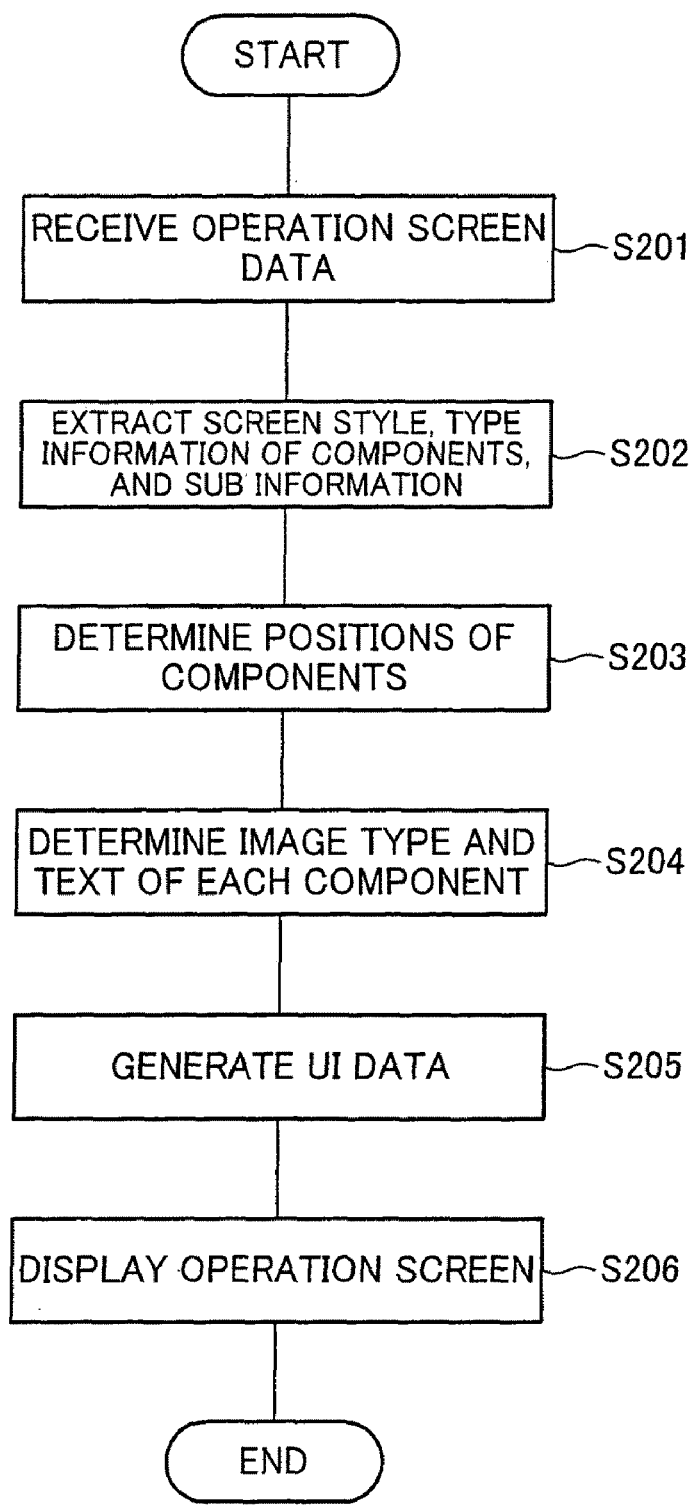
FIG. 24 relates to an embodiment of the present invention and is a flowchart showing how the multifunction device operates when the operation panel displays an operation screen based on operation screen data supplied from the control device.

The following will describe the flow of a specific display process of the operation screen, with reference to the flowchart shown in FIG. 24.

First, the UI manager 16a receives the operation screen data supplied from the control device 2 (S201).

FIG. 25 shows an example of the operation screen data supplied from the control device 2. In FIG. 25, the section (A) specifies the design configuration and the title of the operation screen. In the figure, "osa_menu" is screen style information defined for each multifunction device 1. In this case, "osa_menu" indicates a screen style such that a control button is provided at the upper part of the screen whereas a content button is provided at the lower part of the screen.

The section (B) specifies the control button provided at the upper part of the operation screen. The section (C) specifies the title displayed on the control screen. The section (D) specifies the content button. Indicated by type="submit" is a submit button, Title indicates a character string displayed on the button, indicated by type="checkbox" is a checkbox, and indicated by selected="true" is a style instruction to instruct that a button is selected by default.

The UI manager 16a then extracts, from the operation screen data, the screen style information "osa_menu", the component type information, and the sub information (S202).

Thereafter, the UI manager 16a reads out from the screen table storage section (not illustrated) the component display information corresponding to the screen style information "osa_menu", and determines the positions of the components in line with the order of the components in the operation screen data (S203).

Furthermore, the UI manager 16a determines the display type with reference to the component type information ("submit" and "checkbox") extracted from the operation screen data and the component display information, and determines the texts on the components with reference to the sub information (S204).

The UI manager 16a then generates the UI data in accordance with the determinations (S205). For example, the UI manager 16a generates the UI data shown in FIG. 26, from the operation screen data shown in FIG. 25.

Figure 27:
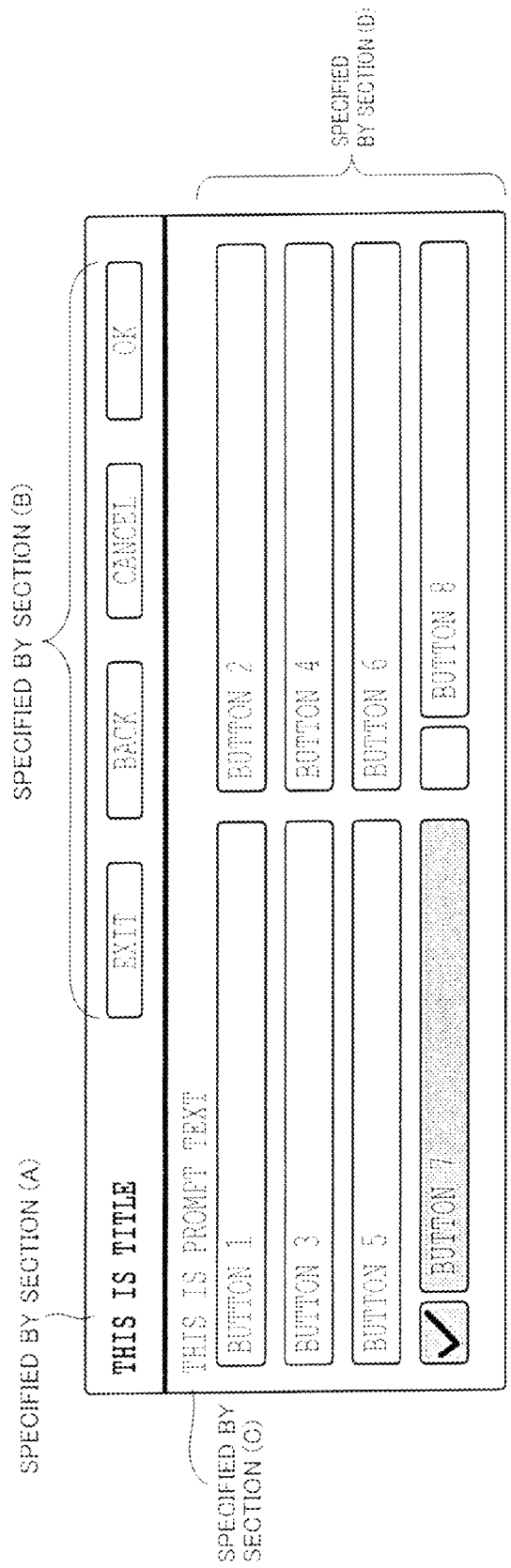
FIG. 27 relates to an embodiment of the present invention and shows an example of an operation screen based on the UI data of FIG. 26.

Thereafter, the UI manager 16a displays the operation screen on the operation panel 6, with reference to the generated UI data. FIG. 27 shows the operation screen based on the UI data of FIG. 26.

As described above, the operation screen data supplied from the control device 2 includes only the screen style information (screen type information), the component type information, and the sub information. The specifications, i.e. shapes, sizes, and locations, of the components are determined by the screen table storage section of the multifunction device 1. With this, each of the multifunction devices can automatically generate and display an operation screen corresponding to the display capabilities (e.g. resolution and display colors) of the operation panel 6 of each multifunction device 1.

FIG. 17 shows an example of an executing function selection screen displayed on the operation panel 6 of the multifunction device 1, in case where the operation panel 6 is low-resolution and monochrome. As shown in FIG. 17, the executing function selection screen is displayed as a simple monochrome image. In the meanwhile, FIG. 20 shows an example of an executing function selection screen displayed on the operation panel 6 of the multifunction device 1, in case where the operation panel 6 can display high-resolution and color images. As shown in FIG. 20, the executing function selection screen in this case is displayed as a high-definition color image.

FIGS. 18 and 19 show examples of setting screens displayed on the operation panel 6 of the multifunction device 1, in case where the operation panel 6 is low-resolution and monochrome. As shown in FIGS. 18 and 19, the setting screens are displayed as simple monochrome images. On the other hand, FIGS. 21 and 22 show examples of setting screens displayed on the operation panel 6 of the multifunction device 1, in case where the operation panel 6 can display high-resolution color images. As shown in FIGS. 21 and 22, the setting screens are displayed as high-definition color images.

Variant Example

In the present embodiment, a control instruction including setting information is supplied to a multifunction device 1 which has a function indicated by selected function identification information. However, since the present invention is not limited to this arrangement, a control instruction including setting information may be supplied to a multifunction device 1 which is capable of executing a function indicated by selected function identification information. In this case, as shown in FIG. 5, since the multifunction device function list table includes information indicating the statuses (normal/abnormal) of the multifunction devices, the multifunction device specifying section 238 specifies, among all of the multifunction devices, a multifunction device which is normal and has a function indicated by the selected function identification information, with reference to the multifunction device function list table.

The blocks in the multifunction device 1 and the control device 2 may be realized by hardware logic. Alternatively, the blocks may be realized by software, with the use of a CPU as follows.

That is, the multifunction device 1 and the control device 2 may include members such as: a CPU that executes instructions of a control program realizing the functions; a ROM recording the program; a RAM on which the program is executed; and a storage device (recording medium) such as a memory, which stores the program and various kinds of data. The objective of the present invention can be achieved in the following manner: program code (e.g. an executable code program, intermediate code program, and source program) of the control program of the multifunction device 1 and the control device 2, the control program being software for realizing the functions, is recorded on a recording medium in a computer-readable manner, this recording medium is supplied to the multifunction device 1 and the control device 2, and the computer (or CPU or MPU) reads out the program code from the recording medium and execute the program.

Examples of such a recording medium include a tape, such as a magnetic tape and a cassette tape; a magnetic disk, such as a flexible disk and a hard disk; a disc including an optical disc, such as a CD-ROM/MO/MD/DVD/CD-R; a card, such as an IC card (inclusive of a memory card); and a semiconductor memory, such as a mask ROM, an EPROM (Erasable Programmable Read Only Memory), an EEPROM (Electrically Erasable Programmable Read Only Memory), or a flash ROM.

Alternatively, a multifunction device control system including the multifunction device 1 and the control section 2 may be capable of being connected to a communications network, allowing the program code to be supplied via the communications network. Non-limiting examples of the communications network include the Internet, intranet, extranet, LAN, ISDN, VAN CATV network, virtual private network, telephone network, mobile communications network, and satellite communications network. Non-limiting examples of the transmission media composing the communications network are, wired media such as IEEE1394, USB, power line communication, cable TV lines, telephone lines, and ADSL lines, infrared light such as IrDA and remote controller, electric waves such as Bluetooth®, IEEE802.11, HDR, mobile telephone network, satellite connection, and terrestrial digital broadcasting network. It is also noted the present invention may be realized by a carrier wave or as data signal sequence, which are realized by electronic transmission of the program code.

Embodiment 2

Figure 28:
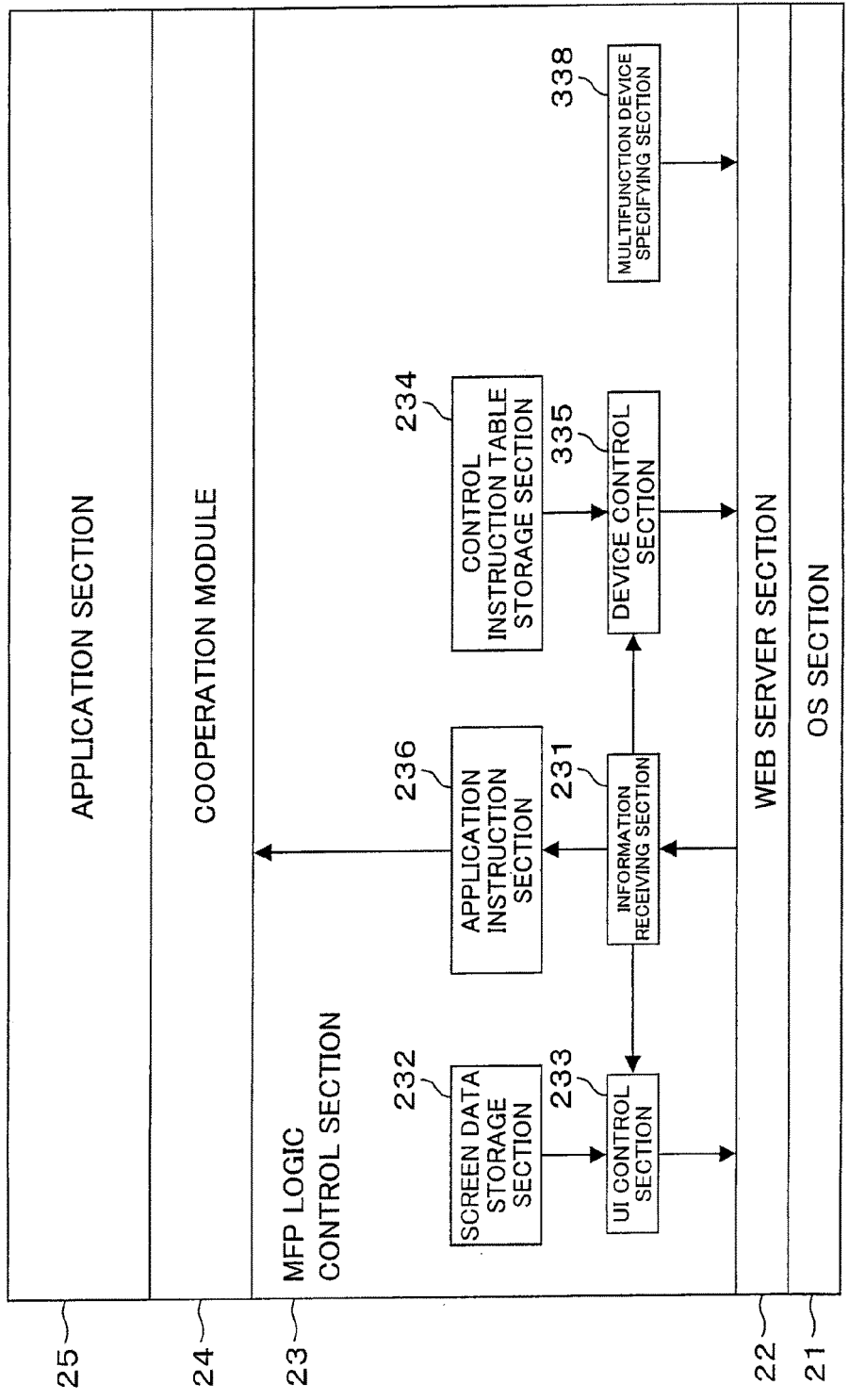
FIG. 28 relates to another embodiment of the present invention and is a block diagram showing a functional arrangement of a control device.
Figure 29:
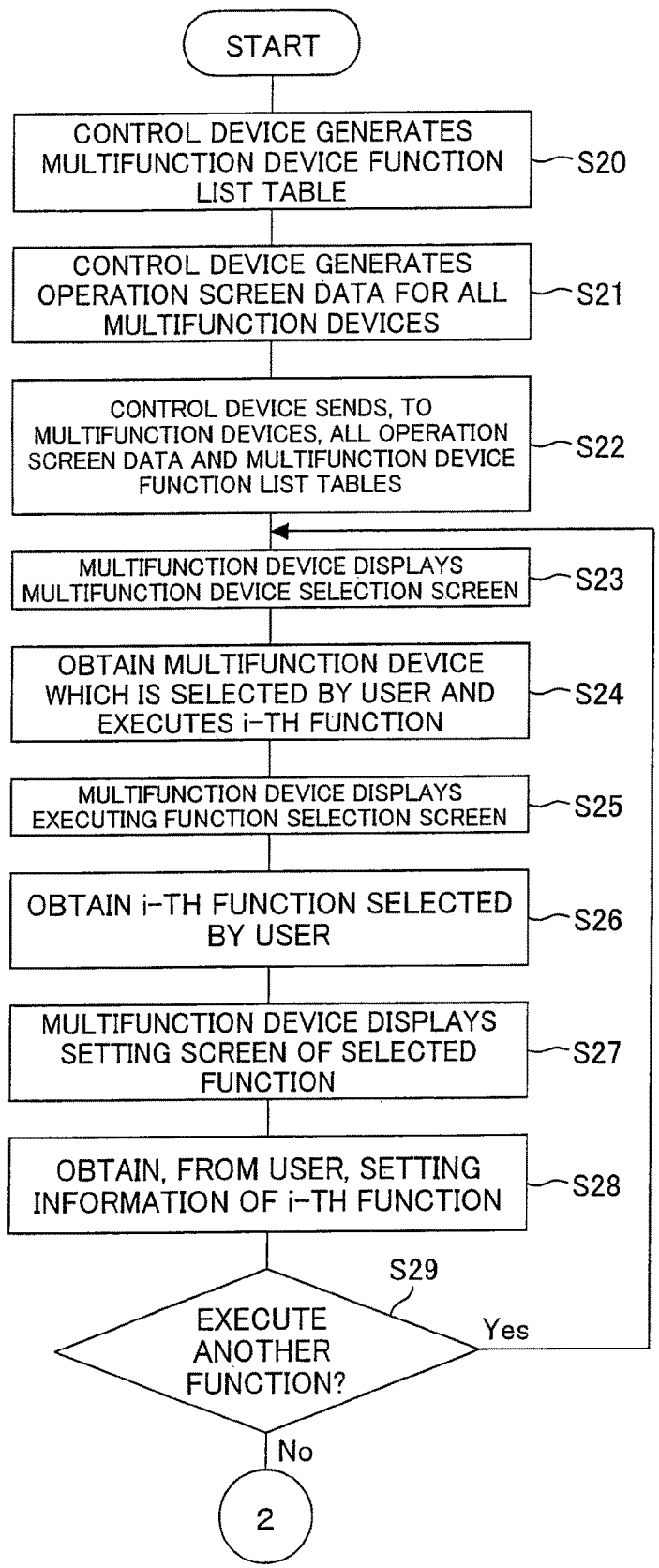
FIG. 29 relates to an embodiment of the present invention and is a flowchart showing the first half of an overall operation of a multifunction device control system.
Figure 30:
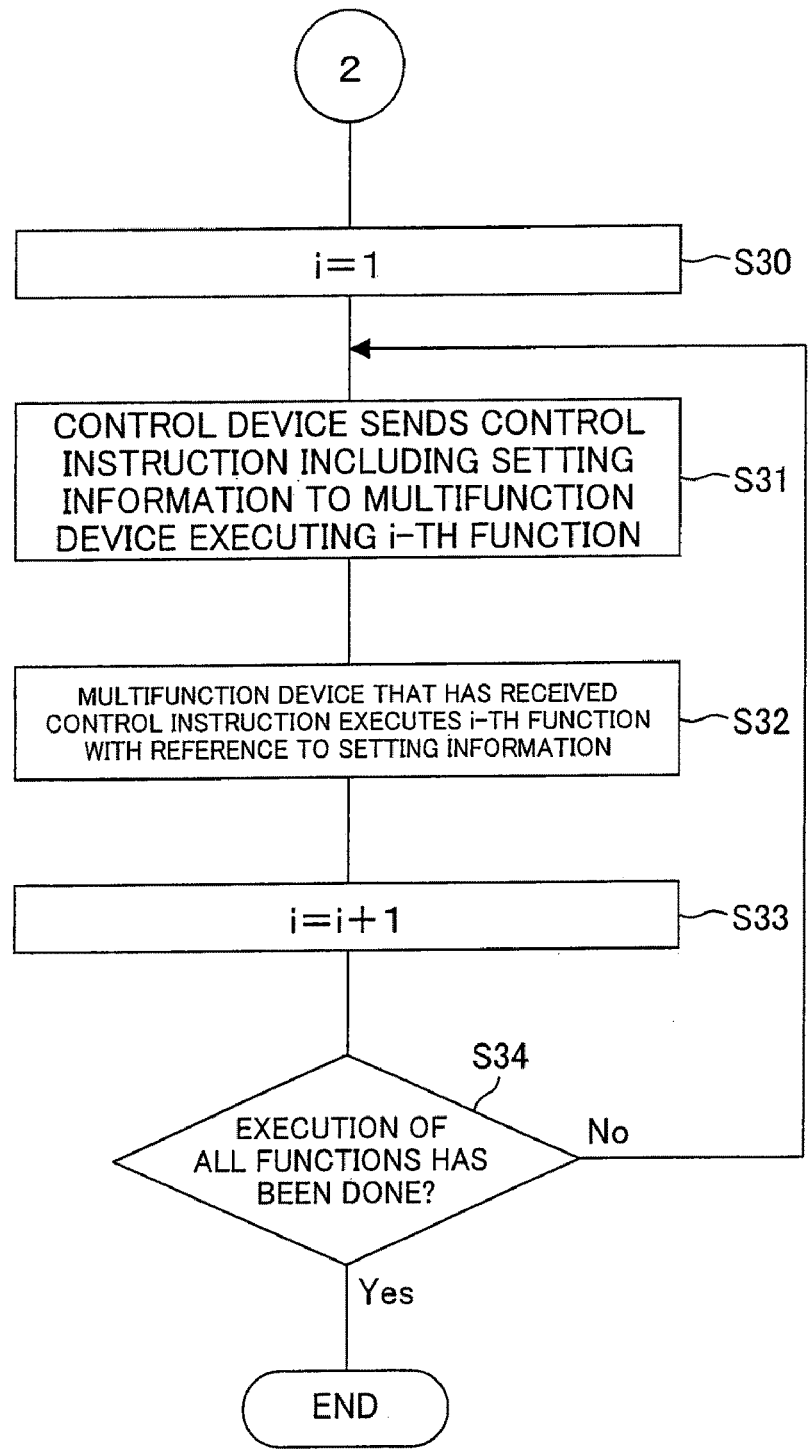
FIG. 30 relates to an embodiment of the present invention and is a flowchart shown the second half of the overall operation of the multifunction device control system.

The following will describe another embodiment of the present invention with reference to FIGS. 28-30. In the above-described embodiment 1, a set of data of each operation screen including an executing function selection screen and a setting screen is supplied from the control device 2 each time the operation screen is required to be displayed. On the other hand, in the present embodiment, each of the multifunction devices 1 obtains sets of data of all operation screens in advance from the control device 2 and stores them in a screen data storage section (not illustrated) of itself, and reads out a set of data of an operation screen from the screen data storage section as need arises and displays the operation screen on the operation panel 6.

In the present embodiment, only features different from those of the multifunction device control system of the embodiment 1 will be discussed, and those identical with the embodiment 1 are not explained here.

FIG. 28 is a block diagram showing a functional arrangement of the control device 2 in the multifunction device control system of the present embodiment. As shown in FIG. 28, an MFP control logic section 23 of the control device 2 does not include the function list generation section 239 and the multifunction device function list generation table 237, and includes a multifunction device specifying section 338 and a device control section 335 which are different from those of the embodiment 1 in terms of the functions.

FIGS. 29 and 30 are flowcharts which outline the operation of the multifunction device control system of the present embodiment. First, in the present embodiment, the multifunction device specifying section 338 of the control device 2 obtains lists of functions of the multifunction devices in a manner similar to the function list generation section 239 of the embodiment 1, and then generates a multifunction device function list table (S20).

Subsequently, a UI control section 233 of the control device 2 generates all sets of operation screen data for all multifunction devices, with reference to the multifunction device function list table generated by the multifunction device specifying section 338 (S21). More specifically, the UI control section 233 generates data of a multifunction device selection screen, for a start. The multifunction device selection screen, which is one type of operation screens, displays, as selection items, all multifunction devices 1 on the network so as to prompt the user to select which multifunction device to use for the execution of the function. Also, the UI control section 233 generates sets of data of executing function selection screens for all multifunction devices. An executing function selection screen for each multifunction device displays, as selection items, all functions of that multifunction device 1. Moreover, the UI control section 233 generates sets of data of setting screens for all functions. The data of the multifunction device selection screen, the data of the executing function selection screen, and the data of the setting screen are identical with those in the above-described embodiment 1.

Thereafter, the UI control section 233 sends, to all multifunction devices 1 on the network, operation screen data including data of the multifunction device selection screens, data of executing function selection screens for all multifunction devices, and data of setting screens for all functions (S22). The UI manager 16a of the multifunction device 1 receives the operation screen data supplied from the control device 2, and stores the received data in a screen data storage section (not illustrated). As a result, each of the multifunction devices 1 on the same network as the control device 2 now has (i) the data of the executing function selection screens which make it possible to select a function of another multifunction device 1 and (ii) the data of the setting screens regarding functions that the multifunction device 1 does not have.

The exchange of the operation screen data between the control device 2 and the multifunction devices 1 in the step S22 is carried out by the same method as that used in the exchange of the operation data in the embodiment 1.

Thereafter, the UI manage 16a of the multifunction device 1 reads out data of a multifunction device selection screen from the screen data storage section, and displays on the operation panel 6 the multifunction device selection screen corresponding to the data (S23).

Then the user selects, by using the operation panel 6, which multifunction device 1 to use for the execution of the function, with reference to the multifunction device selection screen displayed on the operation panel 6 of the multifunction device 1. As a result, the UI manager 16a of the multifunction device 1 obtains, via the operation panel 6, selected multifunction device information for specifying which multifunction device has been selected by the user (S24). The UI manager 16a then sends the selected multifunction device information to the control device 2.

Subsequently, the UI manager 16a of the multifunction device 1 reads out, from the screen data storage section, data of an executing function selection screen of the multifunction device 1 which has been selected by the user, and displays on the operation panel 6 the executing function selection screen corresponding to the data (S25). In this executing function selection screen, all functions of the multifunction device 1 which has been selected by the user in the step S24 are listed as selection items.

The user selects, by using the operation panel 6, a function to be executed, with reference to the executing function selection screen displayed on the operation panel 6 of the multifunction device 1. As a result, the UI manager 16a of the multifunction device 1 obtains, via the operation panel 6, selected function information for specifying which function is selected by the user (S26). The UI manager 16a then sends the obtained selected function information to the control device 2.

Thereafter, the UI manager 16a of the multifunction device 1 reads out, from the screen data storage section, data of a selection screen for the function selected by the user, and displays on the operation panel 6 the setting screen corresponding to the data (S27).

Then the user inputs, by using the operation panel 6, the setting information regarding the function selected in the step S26, with reference to the setting screen displayed on the operation panel 6 of the multifunction device 1. As a result, the UI manager 16a of the multifunction device 1 obtains the setting information regarding the function selected in the step S26 (S28). The UI manager 16a then sends the obtained setting information to the control device 2.

If the execution of another function is instructed at this stage, the process goes back to the step S23. If the execution of all functions has already been instructed, the process proceeds to the step S30 shown in FIG. 30. As a result of the steps above, the control device 2 obtains at least one group of the selected multifunction device information for specifying which multifunction device is used for the execution of function, the selected function information for specifying the function, and the setting information regarding the selected function.

Subsequently, as shown in FIG. 30, the device control section 235 of the control device 2 sets a variable i, which indicates the number of the function to be executed, at 1 (S30).

The device control section 235 then obtains (i) the selected multifunction device information supplied form the multifunction device 1 in the step S24, (ii) the selected function information supplied from the multifunction device 1 in the step S26, and (iii) the setting information supplied from the multifunction device 1 in the step S28, from the information receiving section 231 that has received these sets of information.

The device control section 235 then sends, to the multifunction device specified by the i-th selected multifunction device information supplied from the multifunction device 1, a control instruction to instruct the specified multifunction device to execute the function specified by the i-th selected function information supplied from the multifunction device 1 (S31). The control instruction includes, as in the case of the embodiment 1, the setting information regarding the function specified by the selected function information.

Thereafter, in a similar manner as the step S19 of the embodiment 1, in the multifunction device 1 having received the control instruction, the job manager 17b calls an appropriate module in the OSA application layer 18 in response to the control instruction, the OSA application layer 18 controls the services in the service layer 13 via the Open I/F layer 19, and the services in the service layer 13 executes the function (S32). The function is executed in accordance with the setting information included in the control instruction.

The control device 2 then increments the variable i (S33). If the execution of all functions has not been completed, the process goes back to the step S31, and the steps S31 to S33 are repeated until the execution of all functions is completed. If the execution of all functions has been completed in the step S33, the process is finished.

As described above, the control device 2 included in the multifunction device control system of the embodiments 1 and 2 includes: the information receiving section 231 which receives, from the multifunction device 1 operated by the user (hereinafter, operated multifunction device 1), selected function information including information which indicates that the operated multifunction device 1 is instructed to execute a function that the operated multifunction device 1 does not have and which also indicates the type of the function to be executed; the multifunction device specifying section 238 which specifies, among plural multifunction device 1 on the network, a multifunction device 1 which has the function specified by the selected function information that the information receiving section 231 has received; the UI control section 233 which sends to the operated multifunction device 1 the data of the setting screen for prompting the user to input setting information regarding the function that the operated multifunction device 1 does not have; and the device control section 235 which receives from the operated multifunction device 1 the setting information regarding the function specified by the selected function information that the information receiving section 231 has received and, sends the supplied setting information to the multifunction device 1 that has been specified by the multifunction device specifying section 238.

The multifunction device 1 includes: the UI service layer 16 which carries out, when the multifunction device 1 is instructed by the user to execute a function that that multifunction device 1 does not have, transmission of the selected function information to the control device 2, receiving of data of a setting screen of the function that the device 1 does not have, displaying, on the operation panel 6, of the setting screen corresponding to the supplied data, receiving of the setting information from the user, and transmission of the obtained setting information to the control device 2; the Web service layer 17 which receives the setting information and the control instruction from the control device 2; and the service layer 13 which executes, in response to the supply of the control instruction and the setting information to the control instruction receiving means, the function specified by the supplied control instruction, with reference to the setting information included in the control instruction.

According to this arrangement, in the operated multifunction device 1, the information receiving section 231 receives the selected function information which is transmitted when the user instructs to execute a function that the operated multifunction device 1 does not have. Then the multifunction device specifying section 238 specifies, among plural multifunction devices 1 on the network, the multifunction device 1 having the function specified by the selected function information. On this account, the function that the operated multifunction device 1 does not have can be executed by an alternative multifunction device 1.

According to the arrangement above, furthermore, data of a setting screen which prompts the user to input setting information regarding the function that the operated multifunction device 1 does not have is supplied to the operated multifunction device 1 by the UI control section 233. The operated multifunction device 1 can therefore display the setting screen of the function that that multifunction device 1 does not have. The setting information that the user has inputted is supplied from the operated multifunction device 1 to the control device 2. This setting information is received by the device control section 235, and is sent to the multifunction device 1 specified by the multifunction device specifying section 238, i.e. to the multifunction device 1 that actually executes the function. The user can therefore input the setting information of the function to be executed, to the multifunction device 1 to which the execution of the function has been instructed.

In the control device 2 of the embodiment 1 and 2, the device control section 235 receives from the operated multifunction device 1 the setting information regarding the function specified by the selected function information supplied to the information receiving section 231, and sends, to the multifunction device 1 specified by the processing device specifying means, the control instruction which instructs to execute the function specified by the selected function information.

According to this arrangement, not only the setting information but also the control instruction are sent from the control device 2 to the multifunction device 1 which actually executes the function. The control device 2 can therefore control both the execution of functions and the notification of setting information, with regard to the multifunction devices 1 on the network.

The control device 2 of the embodiment 1 further includes: the multifunction device function list table storage section 237 storing the multifunction device function list table in which the functions of each multifunction device 1 are listed for each multifunction device 1; and the function list generation section 239 which obtains the list information of the functions of each multifunction device 1 from multifunction devices 1, generates the multifunction device function list table based on the obtained list information, and stores the generated table in the multifunction device function list table storage section 237. The multifunction device specifying section 238 specifies which multifunction device 1 has the function specified by the selected function information, with reference to the multifunction device function list table.

According to this arrangement, the function list generation section 239 generates in advance the multifunction device function list table in which the functions of each multifunction device 1 are listed for each multifunction device 1, and the generated table is stored in the multifunction device function list table storage section 237. With reference to this multifunction device function list table, the multifunction device specifying section 238 specifies the multifunction device 1 which has the function selected by the user. It is therefore possible to swiftly specify which multifunction device 1 has the function, without each time asking each of the multifunction devices 1 on the network if they have the selected function.

In the multifunction device control system of the embodiments 1 and 2, the UI control section 233 of the control device 2 sends to the operated multifunction device 1 data of an executing function selection screen which displays selection items of functions that the operated multifunction device 1 does not have, in addition to the functions of the operated multifunction device 1.

According to this arrangement, each multifunction device 1 is not required to manage the data of the executing function selection screen by itself, and the control device 2 centrally manages the data of the executing function selection screen. On this account, when the number of function selection items displayed on the executing function selection screen increases or decreases, it is possible to efficiently change the executing function selection screen for all multifunction devices.

In the multifunction device control system of the embodiment 1 and 2, the UI control section 233 of the control device 2 determines which functions are displayed as selection items on the executing function selection screen, with reference to the multifunction device function list table, and generates the data of the executing function selection screen on which the selection items of the functions thus determined are displayed.

It is therefore possible to dynamically change the selection items displayed on the executing function selection screen, in accordance with the functions of the multifunction devices 1 on the network.

In the multifunction device control system of the embodiments 1 and 2, regardless of whether the operated multifunction device 1 has the function to be executed, the information receiving section 231 of the control device 2 receives, from the operated multifunction device 1, the selected function information including information which indicates that the execution of the function has been instructed to the operated multifunction device 1 and which also indicates the type of the function to be executed, regardless of whether the operated multifunction device 1 has the function to be executed.

According to this arrangement, the control device 2 can totally grasp which function is instructed to be executed in the operated multifunction device 1. This makes it easily to construct an accounting system or the like.

In the multifunction device control system of the embodiments 1 and 2, the UI control section 233 of the control device 2 sends the data of setting screens of all functions to the operated multifunction device 1, regardless of whether the operated multifunction device 1 has these functions.

According to the arrangement above, each multifunction device 1 is not required to manage the data of the setting screen by itself, and the control device 2 centrally manages the data of the setting screen. On this account, when the number of items displayed on the setting screen increases or decreases, it is possible to efficiently change the setting screens for all multifunction devices.

In the multifunction device control system of the embodiment 1, each time the selected function information is supplied to the information receiving section 231, the UI control section 233 of the control device 2 sends, to the operated multifunction device 1, data of a setting screen of the function specified by the selected function information.

According to this arrangement, a setting screen can be easily changed, without rewriting the data of the setting screen stored in each of the multifunction devices 1.

In the multifunction device control system of the embodiments 1 and 2, in addition to the function that the operated multifunction device 1 does not have, a function that the operated multifunction device 1 has but cannot execute may be executed by a multifunction device 1 which is different from the operated multifunction device 1.

According to this arrangement, for example, a function that the operated multifunction device 1 cannot execute because of paper jam or the like can be executed by another multifunction device 1 as a substitute.

In the embodiments, the control device 2 controls the multifunction devices 1 each having plural functions related to respective image processes. However, since the present invention is not limited to this arrangement, a device controlled by the control device 2 may be a printer which only has a printing function or a scanner which only has a scanning function.

According to this arrangement, for example, a scanning function can be set by a printer only having a printing function. The user can therefore use, by an image processing device that he/she is operating, functions of all image processing devices on the single network, and can input setting information of these functions.

In the aforesaid multifunction device control system of the embodiments 1 and 2, the operated multifunction device 1 may have a function to generate image data, e.g. a scanning function, but not have a function to process the generated image data, e.g. an OCR function and a translation function.

According to this arrangement, a function to generate image data, such as a scanning function, is executed by the operated multifunction device, 1, whereas a function to process the generated image data, e.g. an OCR function and a translation function, is executed by a multifunction device 1 which is different from the operated multifunction device 1.

In the aforesaid multifunction device control system of the embodiments 1 and 2, each of the multifunction devices 1 includes: the service layer 13 which is elemental function executing means for executing plural elemental functions for achieving a function; and the Open I/F layer 19 which (i) stores a command conversion table that indicates how control instructions are associated with second APIs (second control commands) that the service layer 13 can receive, (ii) specifies, when the Web service layer 17 receives a control instruction which includes first APIs (first control commands), second APIs corresponding to the supplied first APIs, with reference to the command conversion table, and (iii) outputs the specified second APIs to the service layer 13.

In the multifunction device control system of the embodiments 1 and 3, first APIs included in the control instruction are shared among the multifunction devices 1, whereas second APIs supplied to the service layer 13 are different among the multifunction devices 1.

As shown in FIG. 7, the service layer 13 is typically unique to each type of the multifunction device 1. On this account, the second APIs that the service layer 13 can receive are different among different types of the multifunction devices 1.

According to the arrangement above, the Open I/F layer 19 receive first APIs, specifies, in the command conversion table, second APIs corresponding to these first APIs, and outputs the specified second APIs to the service layer 13. With this, even if the second APIs depend on the type of the multifunction device 1 as described above, the first APIs that the Open I/F layer 19 can receive do not depend on the type of the multifunction device 1.

Therefore, when an external control device 2 controls a multifunction device 1, the control device 2 inputs, to the multifunction device 1, either first APIs which do not depend on the type of the multifunction device 1 or a control instruction which is the basis for such first APIs. As a result, when a control device 2 newly controls a multifunction device 1, the control device 2 is developed so as to generate first APIs shared among all types of multifunction devices 1 or a control instruction which is the basis for such first APIs. Such a control device 2 can be easily developed.

In the multifunction device system 2 of the embodiments 1 and 2, the multifunction device 1 includes: the OSA application layer 18 which outputs, in response to a control instruction that the Web service layer 17 has received from the control device 2, first APIs for executing the function specified by the control instruction; and the Open I/F layer 19 which stores a command conversion table which indicates how first APIs are associated with second APIs, specifies, with reference to the command conversion table, the second APIs corresponding to the first APIs supplied from the OSA application layer 18, and outputs the specified second APIs to the service layer 13.

As described above, the first APIs may be shared among all types of the multifunction devices 1. All types of the multifunction devices 1 can therefore share a single type of the OSA application layer 18. This improves the efficiency in the development of the multifunction device 1.

In the multifunction device control system of the embodiments 1 and 2, the UI service layer 16 of the multifunction device 1 requests the control device 2 to send data of a setting screen of a function that the multifunction device 1 does not have, receives the data of the setting screen from the control device in response to the request, and displays on the operation panel 6 the setting screen corresponding to the obtained data. In the meanwhile, the UI control section 233 of the control device 2 receives the aforesaid request from the multifunction device 1, and sends to the multifunction device 1 the data of the requested setting screen.

With this arrangement, the multifunction device 1 is not required to manage data of a setting screen, and requests the control device 2 to send the data as need arises. As a result, when new control of the multifunction device 1 by the control device 2 is developed, it is unnecessary to incorporate, into the multifunction device 1, data of a setting screen. This makes it possible to further improve the efficiency in the development.

In the multifunction device control system of the embodiments 1 and 2, data of a setting screen includes screen style information (screen type information) indicating the screen style (screen type) of an operation screen and component information indicating types of image components constituting the operation screen. The multifunction device 1 further includes a screen table storage section (not illustrated) which stores the screen style information in association with component display information indicating the positions and display styles of the image components on the operation screen whose screen style is indicated by the screen style information, on the operation panel 6. The UI service layer 16 of the multifunction device 1 reads out, from the screen table storage section, the component display information corresponding to the screen style information included in the data of the operation screen obtained from the control device 2, generates the operation screen with reference to the component display information and component type information included in the data of the operation screen obtained from the control device 2, and displays the generated operation screen on the operation panel 6.

According to the arrangement above, the multifunction device 1 stores, in association with the screen style information, the component display information which indicates the positions and display styles of the image components in the operation screen which has the screen style indicated by the screen style information. The operation screen which is actually displayed on the operation panel 6 is suitably adjusted in accordance with the component display information. The control device 2 generates the operation screen data including the screen style information and the component type information which do not depend on the type of the multifunction device 1, and sends the generated operation screen data to the multifunction device 1. The operation panel 6 of the multifunction device 1 therefore displays a suitable operation screen matched with the capability of the panel.

The present invention is not limited to the description of the embodiments above, but may be altered by a skilled person within the scope of the claims. An embodiment based on a proper combination of technical means disclosed in different embodiments is encompassed in the technical scope of the present invention.

As described above, a control device of the present invention or a control device included in an image processing device control system of the present invention includes: information receiving means for receiving, from a first image processing means among said plural image processing devices, selected function information including information which indicates that the first image processing means has been instructed to execute a function that the first image processing means is unable to execute and which also indicates a type of the function to be executed; processing device specifying means for specifying, among said plural image processing devices, an image processing device that is able to execute the function that the first image processing means is unable to execute; UI control means for sending, to the first image processing device, data of a setting screen which prompts the user to input setting information for executing the function that the first image processing device is unable to execute; and device control means for receiving the setting information from the first image processing device, and sending, to the image processing device specified by the processing device specifying means, the supplied setting information and a control instruction which instructs to execute the function indicated by the selected function information.

A method of controlling a control device of the present invention includes the steps of: receiving, from a first image processing device among said plural image processing devices, selected function information including information which indicates that execution of a function that the first image processing device is unable to execute has been instructed to the first image processing device and which also indicates a type of the function to be executed; specifying which image processing device among said plural image processing devices is able to execute the function that the first image processing device is unable to execute; sending, to the first image processing device, data of a setting screen which prompts a user to input setting information for executing the function that the first image processing device is unable to execute; and receiving the setting information from the first image processing device, and sending the setting information and a control instruction which instructs to execute the function indicated by the selected function information, to the image processing device specified by the processing device specifying means.

Therefore, as described above, a function that a predetermined image processing device operated by the user cannot execute can be executed by a substitute device, and the user can input to the predetermined image processing device the setting information in regard of the function.

Preferably, the control device further includes storage means for storing device function list information which indicates, for each of said plural image processing devices, a list of functions of each of said plural image processing devices; and function list generation means for obtaining information of a list of functions that each of said plural image processing devices is able to execute, generating the device function list information based on the obtained information of the list, and storing the device function list information in the storage means, and when the information receiving means receives the selected function information, the processing device specifying means specifies which image processing device is able to execute the function indicated by the selected function information, with reference to the device function list information.

According to this arrangement, the function list generation means generates in advance the device function list information indicating a list of functions that each of the image processing devices can execute, and the device function list information is stored in the storage means. The multifunction device specifying means specifies the image processing device that can execute the function, with reference to the device function list information. On this account, when the user instructs the first image processing device to execute the function, the control device can swiftly specify the image processing device that can execute the function selected by the user, without each time asking the image processing devices on the network if they can execute the selected function.

Preferably, the UI control means sends, to the first image processing device, data of an executing function selection screen which shows selection items of both functions that the first image processing device is unable to execute and functions that the first image processing device is able to execute, so as to prompt the user to select the function to be executed.

According to this arrangement, each of the image processing devices is not required to manage the data of the executing function selection screen, and the control device can centrally manage the data of the executing function selection screens. On this account, when the number of items displayed on the executing function selection screen increases or decreases, it is possible to efficiently change the executing function selection screens for all multifunction devices.

Preferably, the control device further includes: storage means for storing device function list information which indicates, for each of said devices, a list of functions that each of said plural image processing devices is able to execute; and function list generation means for obtaining information of a list of functions that each of said plural image processing device is able to execute, generating the device function list information based on the obtained information of the list, and storing the device function list information in the storage means, the UI control means determining, based on the device function list information, which functions are displayed as the selection items in the executing function selection screen, and generates data of the executing function selection screen which indicates the selection items of the functions thus determined.

According to this arrangement, the function list generation means generates in advance device function list information indicating a list of functions that each of the image processing devices can execute, for each of the image processing devices, and the device function list information is stored in the storage means. The UI control means generates the data of the executing function selection screen with reference to the device function list information. On this account, it is possible to dynamically change the selection items of the functions displayed on the executing function selection screen, in accordance with the functions executable by the image processing devices on the network.

Preferably, the information receiving means receives, from the first image processing device, selected function information including information which indicates that the first image processing device has been instructed to execute either a function that the first image processing device is able to execute or the function that the first image processing device is unable to execute and which also indicates a type of the function to be executed.

According to this arrangement, when the first image processing device is instructed to execute a function, selected function information is always supplied from the first multifunction device to the control device, regardless of whether the first image processing device operated by the user has the function. The control device can therefore totally grasp which function is instructed to be executed in the image processing device operated by the user. This makes it easily to construct an accounting system or the like.

Preferably, the UI control means sends, to the first image processing device, data of a setting screen which prompts a user to input setting information for executing both the function that the first image processing device is unable to execute and a function that the first image processing device is able to execute.

According to this arrangement, each of the image processing devices is not required to manage the data of the setting screen, and the control device can centrally manage the data of the setting screens. On this account, when the number of items displayed on the setting screen increases or decreases, it is possible to efficiently change the setting screens for all multifunction devices.

Preferably, when the information receiving means receives the selected function information, the UI control means sends, to the first image processing device, data of a setting screen which prompts the user to input setting information in regard of the function indicated by the selected function information that the information receiving means has received.

According to this arrangement, the setting screen can be easily changed without rewriting the data of the setting screen stored in all of the multifunction devices 1.

The function that the first image processing device is unable to execute may be a function that the first image processing device does not have.

In this case, a function that the first image processing device operated by the user cannot execute can be executed by another image processing device on the network.

The image processing device may be a multifunction device which has plural functions at least including a copying function.

According to this arrangement, a function that the first image processing device operated by the user cannot execute can be executed by another image processing device on the network, and the user can input the setting information regarding the function to the multifunction device operated by the user.

For example, the first processing device has a function to generate image data but does not have a function to process the generated image data.

According to this arrangement, for example, a function to generate image data, such as a scanning function, is executed by the first image processing device operated by the user, whereas a function to process the generated image data, such as an OCR function and a translation function, is executed by an image processing device different from the first image processing device.

Preferably, as the function executing means, each of said plural image processing devices further includes: elemental function executing means for executing plural elemental functions by which each of the functions is realized; a storage section which stores command-corresponding information which indicates how control instructions are associated with control commands that the elemental function executing means is able to receive; and control command conversion means for specifying, when the control instruction receiving means receives the control instruction, a control command corresponding to the received control instruction, with reference to the command-corresponding information, and outputs the specified control command to the elemental function executing means.

Preferably, the control instructions are shared among said plural image processing devices, whereas the control commands are different among said plural image processing devices.

The elemental function executing means is typically unique to each type of the image processing device. On this account, control commands that the elemental function executing means can receive are different among the types of the image processing devices.

However, in the arrangement above, the control command conversion means receives the control instruction, specifies, in the command-corresponding information, the control command corresponding to the control instruction, and sends the specified control command to the elemental function executing means. With this, even if control commands that the elemental function executing means can receive depend the type of the image processing device, control instructions that the image processing device can receive do not depend on the type of the image processing device.

Therefore, an external control device can control an image processing device in such a manner that the control device outputs, to the image processing device, a control instruction that does not depend on the type of the image processing device. As a result, when a control device newly controls an image processing device, the control device is developed in such a manner as to generate a control instruction shared among all types of the image processing devices, and such a control device can be efficiently developed.

Preferably, each of said plural image processing devices includes: elemental function executing means for executing plural elemental functions by which each of the functions is realized; function control means for generating, in response to the control instruction supplied from the control device to the control instruction receiving means, a first control command for executing the function indicated by the control instruction; a storage section which stores command-corresponding information indicating how first control commands are associated with second control commands that the elemental function executing means can receive; and control command conversion means for specifying, with reference to the command-corresponding information, the second control command corresponding to the first control command that the function control means has generated, and outputs the specified second control command to the elemental function executing means.

As described above, control instructions may be shared among all types of the image processing devices. The function control means may therefore be shared among all types of the image processing devices, and hence the image processing devices can be efficiently developed.

Preferably, the UI processing means of each of said plural image processing devices (i) sends, in regard of the function that that information processing device is unable to execute, request information requesting the data of the setting screen for that function, to the control device, (ii) obtains, in response to the request information, the data of the setting screen, and (iii) displays, on the display section, the setting screen corresponding to the obtained data of the setting screen, and the UI control means of the control device receives the request information from that image processing device, and sends to that image processing device the data of the setting screen which is requested by the request information.

According to this arrangement, the image processing device is not required to manage the data of the setting screen, and requests the control device to send the data as necessity arises. As a result, when a new control of the image processing device by the control device is developed, it is unnecessary to incorporate the data of a new setting screen into the image processing device. For this reason, the efficiency in the development is further improved.

Preferably, the data of the setting screen includes screen type information indicating a screen type of the setting screen and component information indicating a type of an image component constituting the setting screen, each of said plural image processing devices further includes a screen table storage section in which the screen type information is associated with a position and a display type of the image component in the setting screen whose screen type is indicated by the screen type information, and the UI processing means of each of said plural image processing devices (i) reads out, from the screen table storage section, the component display information corresponding to the screen type information which is included in the data of the setting screen obtained from the control device, (ii) generates the setting screen with reference to the component display information and component type information included in the data of the setting screen obtained from the control device, and (iii) displays the setting screen on the display section.

According to this arrangement, the image processing device stores, in association with the screen type information, the component display information which indicates the positions and display types of the image components in the operation screen whose screen type is indicated by the screen type information. The setting screen which is actually displayed on the display section is suitably adjusted in accordance with the component display information. Therefore, even through the control device generates the setting screen data including the screen type information and component type information independent of the type of the image processing device and sends the generated setting screen data to the image processing device, a suitable setting screen corresponding to the capabilities of the display section is displayed on the display section of the image processing device.

The present invention is, for example, suitably used for a control device controlling plural network-connected multi-function devices and for a multifunction device control system.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A control device which is connected to and able to communicate with plural image processing devices executing functions regarding image processing, comprising:
    information receiving means for receiving, from a first image processing device among said plural image processing devices, selected function information including information which indicates that the first image processing device has been instructed to execute a function that the first image processing device is unable to execute and which also indicates a type of the function to be executed;
    processing device specifying means for specifying, among said plural image processing devices, an image processing device which is able to execute the function that the first image processing device is unable to execute;
    UI control means for sending, to the first image processing device, data of a setting screen which prompts a user to input setting information for executing the function that the first image processing device is unable to execute; and
    device control means for receiving the setting information from the first image processing device, and sending, to the image processing device specified by the processing device specifying means, the setting information and a control instruction which instructs to execute the function indicated by the selected function information.

2. The control device as defined in claim 1, further comprising:
    storage means for storing device function list information which indicates, for each of said plural image processing devices, a list of functions of each of said plural image processing devices; and
    function list generation means for obtaining information of a list of functions that each of said plural image processing devices is able to execute, generating the device function list information based on the obtained information of the list of functions, and storing the device function list information in the storage means,
    the processing device specifying means specifying which image processing device is able to execute the function indicated by the selected function information, with reference to the device function list information.

3. The control device as defined in claim 1,
    wherein, the UI control means sends, to the first image processing device, data of an executing function selection screen which shows selection items of both functions that the first image processing device is unable to execute and functions that the first image processing device is able to execute, so as to prompt the user to select the function to be executed.

4. The control device as defined in claim 3, further comprising:
    storage means for storing device function list information which indicates, for each of said plural image processing devices, a list of functions that each of said plural image processing devices is able to execute; and
    function list generation means for obtaining information of a list of functions that each of said plural image processing devices is able to execute, generating the device function list information based on the obtained information of the list of functions, and storing the device function list information in the storage means,
    the UI control means determining, based on the device function list information, which functions are displayed as the selection items in the executing function selection screen, and generates data of the executing function selection screen which indicates the selection items of the functions thus determined.

5. The control device as defined in claim 1,
    wherein, the information receiving means receives, from the first image processing device, selected function information including information which indicates that the first image processing device has been instructed to execute either a function that the first image processing device is able to execute or the function that the first image processing device is unable to execute and which also indicates a type of the function to be executed.

6. The control device as defined in claim 1,
    wherein, the UI control means sends, to the first image processing device, data of a setting screen which prompts a user to input setting information for executing both the function that the first image processing device is unable to execute and a function that the first image processing device is able to execute.

7. The control device as defined in claim 1,
    wherein, when the information receiving means receives the selected function information, the UI control means sends, to the first image processing device, data of a setting screen which prompts the user to input setting information in regard of the function indicated by the selected function information.

8. The control device as defined in claim 1,
    wherein, the function that the first image processing device is unable to execute is a function that the first image processing device does not have.

9. The control device as defined in claim 1,
    wherein, the image processing device is a multifunction device which has plural functions at least including a copying function.

10. The control device as defined in claim 1,
    wherein, the first image processing device has a function to generate image data but does not have a function to process the generated image data.

11. An image processing device control system, comprising:
    plural image processing devices executing functions regarding image processing; and
    a control device which is connected to and able to communicate with said plural image processing devices and includes: information receiving means for receiving, from a first image processing device among said plural image processing devices, selected function information including information which indicates that the first image processing device has been instructed to execute a function that the first image processing device is unable to execute and which also indicates a type of the function to be executed; processing device specifying means for specifying, among said plural image processing devices, an image processing device which is able to execute the function that the first image processing device is unable to execute; UI control means for sending, to the first image processing device, data of a setting screen which prompts a user to input setting information for executing the function that the first image processing device is unable to execute; and device control means for receiving the setting information from the first image processing device, and sending, to the image processing device specified by the processing device specifying means, the setting information and a control instruction which instructs to execute the function indicated by the selected function information.

12. An image processing device control system, comprising:
    plural image processing devices executing functions regarding image processing; and
    a control device which is connected to and able to communicate with said plural image processing devices,
    the control device including:
    information receiving means for receiving selected function information including information which indicates that a first image processing device has been instructed to execute a function that the first image processing device is unable to execute and which also indicates a type of the function to be executed;
    processing device specifying means for specifying, among said plural image processing devices, an image processing device which is able to execute the function that the first image processing device is unable to execute;
    UI control means for sending, to the first image processing device, data of a setting screen which prompts a user to input setting information for executing the function that the first image processing device is unable to execute; and
    device control means for receiving the setting information from the first image processing device, and sending, to the image processing device specified by the processing device specifying means, the setting information and a control instruction which instructs to execute the function indicated by the selected function information, each of said plural image processing devices including:
a display section;
information notification means for sending, when that information processing device is instructed to execute a function which is unable to be executed by that information processing device, the selected function information including information indicating a type of the function to be executed, to the control device;
UI processing means for (i) receiving, from the control device, data of a setting screen which prompts the user to input setting information in regard of the function that that information processing device is unable to execute, (ii) displaying the setting screen on the display section so as to obtain the setting information from the user, and (iii) sending the obtained setting information to the control device;
control instruction receiving means for receiving, from the control device, the setting information and the control instruction; and
function executing means for executing, when the control instruction receiving means receives the setting information and the control instruction, the function indicated by the received control instruction, based on the received setting information.

13. The image processing device control system as defined in claim 12,
wherein, as the function executing means, each of said plural image processing devices further includes:
elemental function executing means for executing plural elemental functions by which each of the functions is realized;
a storage section which stores command-corresponding information which indicates how control instructions are associated with control commands that the elemental function executing means is able to receive; and
control command conversion means for specifying, when the control instruction receiving means receives the control instruction, a control command corresponding to the received control instruction, with reference to the command-corresponding information, and outputs the specified control command to the elemental function executing means.

14. The image processing device control system as defined in claim 13,
wherein, the control instructions are shared among said plural image processing devices, whereas the control commands are different among said plural image processing devices.

15. The image processing device control system as defined in claim 12,
wherein, as the function executing means, each of said plural image processing devices includes:
elemental function executing means for executing plural elemental functions by which each of the functions is realized;
function control means for generating, in response to the control instruction supplied from the control device to the control instruction receiving means, a first control command for executing the function indicated by the control instruction;
a storage section which stores command-corresponding information indicating how first control commands are associated with second control commands that the elemental function executing means can receive; and control command conversion means for specifying, with reference to the command-corresponding information, a second control command corresponding to the first control command that the function control means has generated, and outputs the specified second control command to the elemental function executing means.

16. The image processing device control system as defined in claim 12,
wherein, the UI processing means of each of said plural image processing devices (i) sends, in regard of the function that that image processing device is unable to execute, request information requesting the data of the setting screen for that function, to the control device, (ii) obtains, in response to the request information, the data of the setting screen, and (iii) displays, on the display section, the setting screen corresponding to the obtained data of the setting screen, and
the UI control means of the control device receives the request information from that image processing device, and sends to that image processing device the data of the setting screen which is requested by the request information.

17. The image processing device control system as defined in claim 16,
wherein, the data of the setting screen includes screen type information indicating a screen type of the setting screen and component information indicating a type of an image component constituting the setting screen,
each of said plural image processing devices further includes a screen table storage section in which the screen type information is associated with a position and a display type of the image component in the setting screen whose screen type is indicated by the screen type information, and
the UI processing means of each of said plural image processing devices (i) reads out, from the screen table storage section, a component display information corresponding to the screen type information which is included in the data of the setting screen obtained from the control device, (ii) generates the setting screen with reference to the component display information and component type information included in the data of the setting screen obtained from the control device, and (iii) displays the setting screen on the display section.

18. A non-transitory computer-readable storage medium storing a program for causing a computer to operate as means of a control device which is connected to and able to communicate with plural image processing devices executing functions regarding image processing and includes:
information receiving means for receiving, from a first image processing device among said plural image processing devices, selected function information including information which indicates that the first image processing device has been instructed to execute a function that the first image processing device is unable to execute and which also indicates a type of the function to be executed;
processing device specifying means for specifying, among said plural image processing devices, an image processing device which is able to execute the function that the first image processing device is unable to execute;
UI control means for sending, to the first image processing device, data of a setting screen which prompts a user to input setting information for executing the function that the first image processing device is unable to execute; and device control means for receiving the setting information from the first image processing device, and sending, to the image processing device specified by the processing device specifying means, the setting information and a control instruction which instructs to execute the function indicated by the selected function information.

19. A method of controlling a control device which is connected to and able to communicate with plural image processing devices executing functions regarding image processing, the method comprising the steps of:

receiving, from a first image processing device among said plural image processing devices, selected function information including information which indicates that execution of a function that the first image processing device is unable to execute has been instructed to the first image processing device and which also indicates a type of the function to be executed;

specifying which image processing device among said plural image processing devices is able to execute the function that the first image processing device is unable to execute;

sending, to the first image processing device, data of a setting screen which prompts a user to input setting information for executing the function that the first image processing device is unable to execute; and receiving the setting information from the first image processing device, and sending, by said control device, the setting information and a control instruction which instructs to execute the function indicated by the selected function information, to the specified image processing device.

* * * * *